US010744596B2

(12) United States Patent
Tanaka et al.

(10) Patent No.: US 10,744,596 B2
(45) Date of Patent: Aug. 18, 2020

(54) MATERIAL FEEDER OF ADDITIVE MANUFACTURING APPARATUS, ADDITIVE MANUFACTURING APPARATUS, AND ADDITIVE MANUFACTURING METHOD

(71) Applicant: Kabushiki Kaisha Toshiba, Minato-ku (JP)

(72) Inventors: Masayuki Tanaka, Yokohama (JP); Hiroshi Ohno, Yokohama (JP); Shinji Nakata, Yokohama (JP); Morihiro Machida, Chuo (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 323 days.

(21) Appl. No.: 15/124,009

(22) PCT Filed: Sep. 10, 2014

(86) PCT No.: PCT/JP2014/073981
§ 371 (c)(1),
(2) Date: Sep. 6, 2016

(87) PCT Pub. No.: WO2015/145811
PCT Pub. Date: Oct. 1, 2015

(65) Prior Publication Data
US 2017/0021452 A1 Jan. 26, 2017

(30) Foreign Application Priority Data

Mar. 24, 2014 (JP) ................................. 2014-059994

(51) Int. Cl.
*B23K 26/144* (2014.01)
*B33Y 30/00* (2015.01)
(Continued)

(52) U.S. Cl.
CPC .......... *B23K 26/144* (2015.10); *B22F 3/1055* (2013.01); *B23K 15/0026* (2013.01);
(Continued)

(58) Field of Classification Search
CPC ...... B33Y 30/00; B33Y 40/00; B32K 26/144; B23K 26/342; B23K 26/702;
(Continued)

(56) References Cited

U.S. PATENT DOCUMENTS 4,568,028 A * 2/1986 Verseef .................... B60P 1/16
239/657
4,723,817 A * 2/1988 Wallan ..................... B60P 1/26
239/657

(Continued)

FOREIGN PATENT DOCUMENTS

JP       10-264134 A    10/1998
JP    2002-307562 A    10/2002

(Continued)

OTHER PUBLICATIONS

Japanese Office Action dated Dec. 2, 2015 in Japanese Application No. 2014-059994 filed Mar. 24, 2014 (with English Translation).

(Continued)

*Primary Examiner* — Christopher S Kim
(74) *Attorney, Agent, or Firm* — Oblon, McClelland, Maier & Neustadt, L.L.P.

(57) ABSTRACT

A material feeder in an additive manufacturing apparatus according to one embodiment includes a feeding unit. The feeding unit includes a container capable of containing a powdery material, a first wall that is provided with a plurality of openings communicated with the container and that at least partially covers a region onto which the material is fed, and an opening-closing part capable of individually opening and closing the openings, the feeding unit forming (Continued)

a layer of the material on at least a part of the region by feeding the material inside the container onto the region from at least one of the openings that is opened by the opening-closing part.

15 Claims, 14 Drawing Sheets

(51) Int. Cl.
| | |
|---|---|
| *B29C 70/38* | (2006.01) |
| *B22F 3/105* | (2006.01) |
| *B29C 64/153* | (2017.01) |
| *B29C 64/20* | (2017.01) |
| *B33Y 10/00* | (2015.01) |
| *B33Y 40/00* | (2020.01) |
| *B23K 26/342* | (2014.01) |
| *B23K 26/70* | (2014.01) |
| *B23K 15/00* | (2006.01) |

(52) U.S. Cl.
CPC ........ *B23K 15/0086* (2013.01); *B23K 26/342* (2015.10); *B23K 26/702* (2015.10); *B29C 64/153* (2017.08); *B29C 64/20* (2017.08); *B29C 70/386* (2013.01); *B33Y 10/00* (2014.12); *B33Y 30/00* (2014.12); *B33Y 40/00* (2014.12); *B22F 2003/1056* (2013.01); *B22F 2999/00* (2013.01); *Y02P 10/295* (2015.11)

(58) Field of Classification Search
CPC ............ B23K 15/0026; B23K 15/0086; B29C 64/153; B29C 64/20; B29C 70/386; B22F 3/1055; B22F 2003/1056; B22F 2999/00; Y02P 10/295
USPC .......................... 239/562, 566, 374, 379, 657
See application file for complete search history.

(56) References Cited

U.S. PATENT DOCUMENTS

| | | | | |
|---|---|---|---|---|
| 4,877,188 A | * | 10/1989 | Ritter | ........................ A21C 9/04 239/135 |
| 5,794,859 A | * | 8/1998 | Goenka | ..................... B05B 1/30 239/555 |
| 2002/0105114 A1 | | 8/2002 | Kubo et al. | |
| 2009/0025638 A1 | | 1/2009 | Inoue | |

FOREIGN PATENT DOCUMENTS

| | | |
|---|---|---|
| JP | 2007-216595 A | 8/2007 |
| JP | 445304 B2 | 2/2010 |
| JP | 2015-182295 A | 10/2015 |
| JP | 5917586 B2 | 4/2016 |
| WO | 2007/013240 A1 | 2/2007 |

OTHER PUBLICATIONS

Japanese Office Action dated Mar. 4, 2016 in Japanese Application No. 2014-059994 filed Mar. 24, 2014 (with English Translation).
International Search Report dated Nov. 18, 2014 in PCT/JP14/073981 filed Sep. 10, 2014.

* cited by examiner

MATERIAL FEEDER OF ADDITIVE MANUFACTURING APPARATUS, ADDITIVE MANUFACTURING APPARATUS, AND ADDITIVE MANUFACTURING METHOD

CROSS-REFERENCE TO RELATED APPLICATIONS

This application is national stage application of International Application No. PCT/JP2014/073981, filed Sep. 10, 2014, which designates the United States, incorporated herein by reference, and which is based upon and claims the benefit of priority from Japanese Patent Application No. 2014-059994, filed Mar. 24, 2014, the entire contents of which are incorporated herein by reference.

FIELD

Embodiments described herein relate generally to material feeders of additive manufacturing apparatuses, additive manufacturing apparatuses, and additive manufacturing methods.

BACKGROUND

An additive manufacturing apparatus, such as a three-dimensional printer, is known that forms layers of powdery material and successively solidify the material for each layer of the material with a binder (a bonding agent) or a laser beam to manufacture a three-dimensional shape.

DETAILED DESCRIPTION

According to one embodiment, a material feeder of an additive manufacturing apparatus includes a feeding unit. The feeding unit includes a container capable of containing powdery material, a first wall that is provided with a plurality of openings communicated with the container and that at least partially covers a region onto which the material is fed, and an opening-closing part capable of individually opening and closing the openings, the feeding unit forming a layer of the material on at least a part of the region by feeding the material inside the container onto the region from at least one of the openings that is opened by the opening-closing part.

Hereinafter, a first embodiment will be described with reference to FIG. 1 to FIG. 10. In the present specification, a vertically upward direction is defined as an upper direction and a vertically downward direction is defined as a lower direction. A plurality of expressions may be made compatibly for a component according to an embodiment and description thereof. It is not precluded that other expressions that are not described are made for the component and the description. Furthermore, it is not precluded that other expressions are made for a component and description for which a plural expression are not made.

Figure 1:
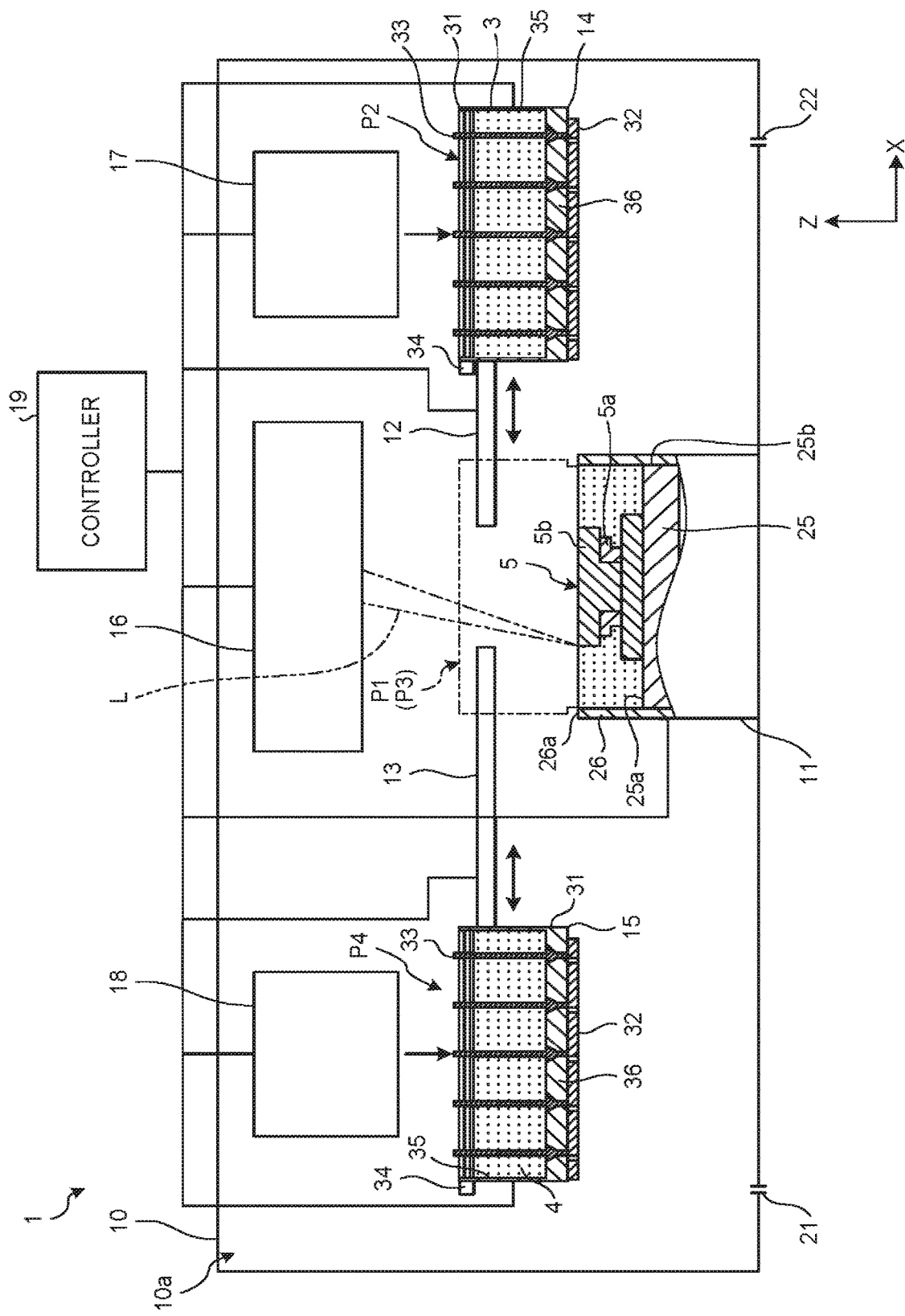
FIG. 1 is a schematic illustrating a three-dimensional printer according to a first embodiment.

FIG. 1 is a view schematically illustrating a three-dimensional printer 1. The three-dimensional printer 1 is an example of the additive manufacturing apparatus. The additive manufacturing apparatus is not limited to a three-dimensional printer and may be an apparatus of a different kind. The three-dimensional printer 1 manufactures a three-dimensionally shaped manufactured object 5 by repeating formation of layers with first material 3 and second material 4 that are powdery, and solidification of the layers with the first material 3 and the second material 4. FIG. 1 illustrates the manufactured object 5 in the middle of the formation thereof. In this embodiment, the first material 3 and the second material 4 are powdery metal material having central particle diameters of about 40 μm. The first material 3 and the second material 4 are different kinds of material. The first material 3 and the second material 4 are not limited to this example.

As illustrated in FIG. 1, the three-dimensional printer 1 includes a treatment tank 10, a stage 11, a first moving device 12, a second moving device 13, a first material feeder 14, a second material feeder 15, an optical device 16, a first material replenishing device 17, and a second material replenishing device 18, and a controller 19.

The treatment tank 10 may be also referred to as a casing, for example. The stage 11 may be also referred to as a platform, an object manufacturing region, or an application region, for example. The first and second moving devices 12 and 13 are examples of a moving unit and may be also referred to as a conveying unit or an evacuating unit, for example. The first and second material feeders 14 and 15 are examples of a feeding unit and may be also referred to as a holding unit, a releasing unit, or a dispersing unit, for example. The optical device 16 is an example of a forming unit and may be also referred to as a shaping unit, a solidifying unit, or a coupling unit, for example. The first and second material replenishing devices 17 and 18 may be also referred to as a feeding unit or a filling unit, for example.

As illustrated in the drawings, an X-axis, a Y-axis, and a Z-axis are defined in the present specification. The X-axis, the Y-axis, and the Z-axis are orthogonal to one another. In the present specification, an X-axis direction, a Y-axis direction, and a Z-axis direction are respectively set to the width direction, the depth (length) direction, and the height direction of the first material feeder 14.

The treatment tank 10 is formed into a box shape that can be hermetically closed, for example. The treatment tank 10 includes a treatment chamber 10*a*. The stage 11, the first moving device 12, the second moving device 13, the first material feeder 14, the second material feeder 15, the optical device 16, the first material replenishing device 17, and the second material replenishing device 18 are contained in the treatment chamber 10*a*. The stage 11, the first moving device 12, the second moving device 13, the first material feeder 14, the second material feeder 15, the optical device 16, the first material replenishing device 17, and the second material replenishing device 18 may be placed outside the treatment chamber 10*a*.

A supply port 21 and a discharge port 22 are provided to the treatment chamber 10*a* in the treatment tank 10. For example, a supply device installed outside the treatment tank 10 supplies inert gas such as nitrogen or argon to the treatment chamber 10*a* through the supply port 21. For example, a discharge device installed outside the treatment tank 10 discharges the inert gas from within the treatment chamber 10*a* through the discharge port 22.

The stage 11 has a platform 25 and a circumferential wall 26. The platform 25 is a square plate material, for example. The shape of the platform 25 is not limited to this example, and may be a member having another shape such as: another quadrangle (quadrilateral) like a rectangle; a polygon; a circle; or a geometrical shape. The platform 25 has an upper face 25*a* and four end faces 25*b*. The upper face 25*a* is a quadrangular flat face of 250 mm by 250 mm. The size of the upper face 25*a* is not limited to this example. Each of the end faces 25*b* is a face orthogonal to the upper face 25*a*.

The circumferential wall 26 extends in a direction along the Z-axis and is formed into a quadrangular tube shape surrounding the platform 25. Each of the four end faces 25*b* of the platform 25 is in contact with the inner face of the circumferential wall 26. The circumferential wall 26 has an upper end 26*a* formed into a quadrangular frame shape and opened.

The platform 25 is movable within the circumferential wall 26 in the direction along the Z-axis with various devices such as a hydraulic elevator. When the platform 25 has moved to the highest reachable position, the upper face 25*a* of the platform 25 forms substantially the same plane as the upper end 26*a* of the circumferential wall 26.

The first moving device 12 has a rail, a conveyance arm, or other various devices coupled to the first material feeder 14, and translates the first material feeder 14, for example. The first moving device 12 moves the first material feeder 14, for example, between a feed position P1 and a standby position P2.

In FIG. 1, the first material feeder 14 at the feed position P1 is indicated by a long dashed double-dotted line, and the first material feeder 14 at the standby position P2 by a solid line. The first material feeder 14 at the feed position P1 is located above the stage 11. The first material feeder 14 at the standby position P2 is located in a place not overlapping a place in which it is located at the feed position P1. For example, the standby position P2 is spaced apart from a first position P1 in a direction along at least one of the X-axis and the Y-axis. In this manner, the first moving device 12 changes a relative position of the first material feeder 14 with respect to the stage 11. The first moving device 12 may move the stage 11 relatively with respect to the first material feeder 14, for example.

The second moving device 13 has a rail, a conveyance arm, or other various devices coupled to the second material feeder 15, and translates the second material feeder 15, for example. The second moving device 13 moves the second material feeder 15, for example, between a feed position P3 and a standby position P4.

In FIG. 1, the second material feeder 15 at the feed position P3 is indicated by a long dashed double-dotted line, and the second material feeder 15 at the standby position P4 by a solid line. The feed position P3 for the second material feeder 15 is the same position as the feed position P1 for the first material feeder 14. The feed positions P1 and P3 of the first and the second material feeders 14 and 15 are not limited to this example.

The second material feeder 15 at the feed position P3 is located above the stage 11. The second material feeder 15 at the standby position P4 is off from a place occupied thereby at the feed position P3. For example, the standby position. P4 is spaced apart from a second position P3 in a direction along at least one of the X-axis and the Y-axis. In this manner, the second moving device 13 changes a relative position of the second material feeder 15 with respect to the stage 11. The second moving device 13 may move the stage 11 relatively with respect to the second material feeder 15, for example.

Figure 2:
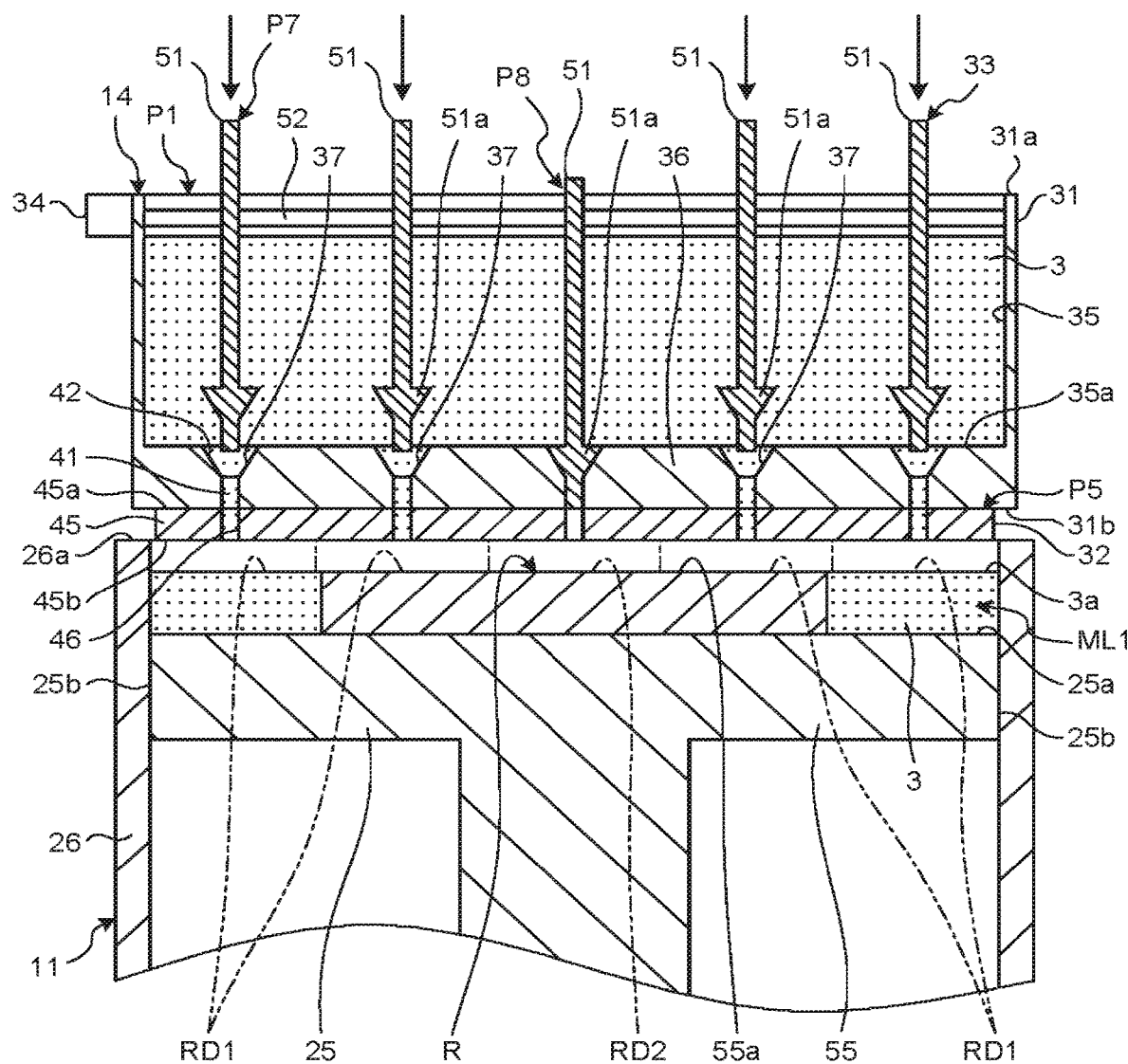
FIG. 2 is a sectional view illustrating a stage and a first material feeder at a feed position in the first embodiment.
Figure 3:
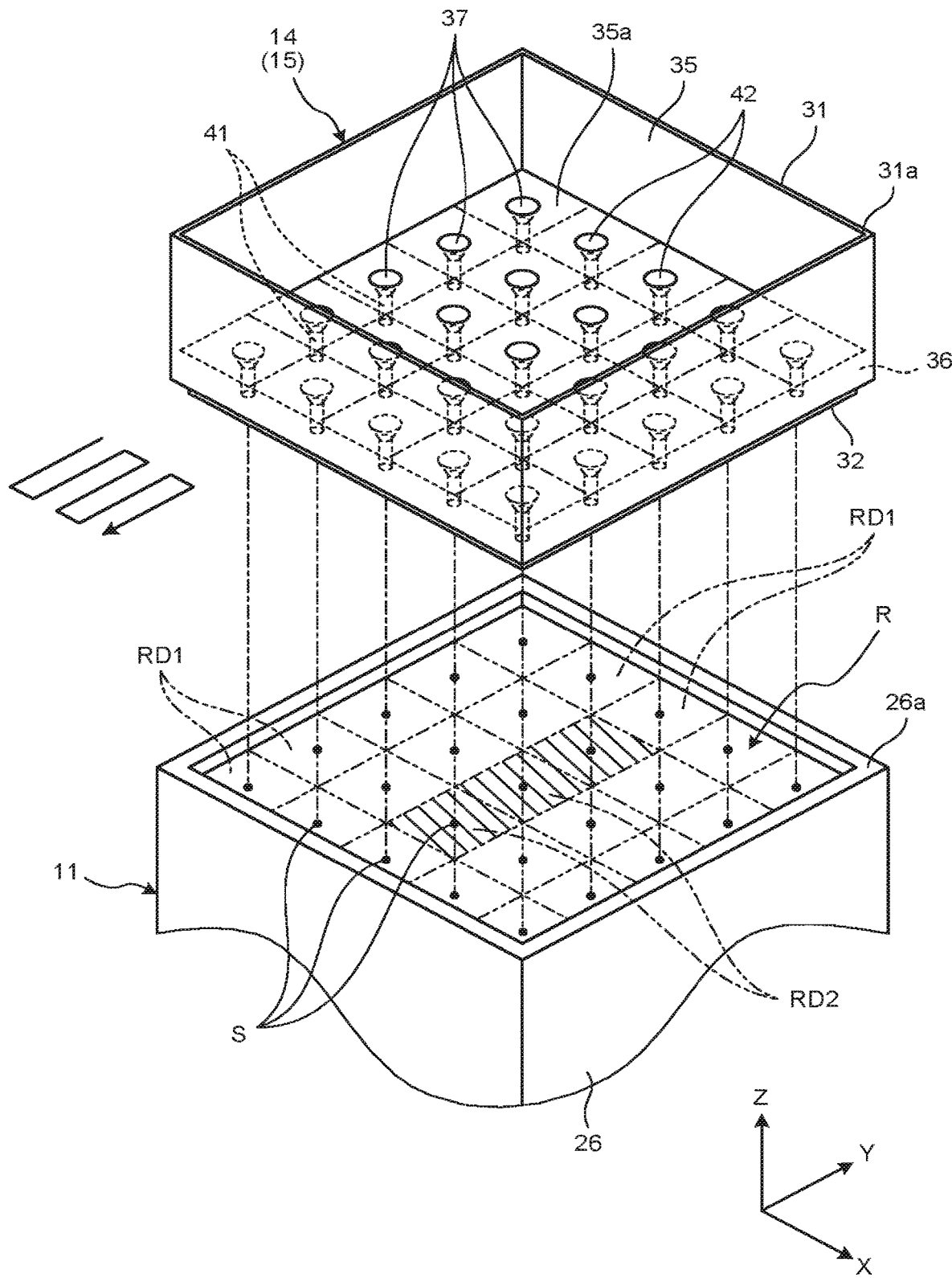
FIG. 3 is a perspective view illustrating the stage and the first material feeder at the feed position in the first embodiment.

FIG. 2 is a sectional view illustrating a part of the stage 11 and the first material feeder 14 at the feed position P1. FIG. 3 is a perspective view illustrating a part of the stage 11 and the first material feeder 14 at the feed position P1. For ease of explanation, FIG. 3 illustrates the first material feeder 14 and the stage 11 in a state spaced apart from each other, and omits some parts of the first material feeder 14.

As illustrated in FIG. 2, the first material feeder 14 includes a tank 31, a shutter 32, an obstructing part 33, and a vibrator 34. The obstructing part 33 is an example of an opening-closing part, and may be also referred to as a shutoff part, an adjustment part, or a regulation part.

The tank 31 is formed into a substantially quadrangular box shape. The tank 31 has an upper face 31*a* and a lower face 31*b*. The upper face 31*a* faces upward and is formed flat. The lower face 31*b*, which is located on the opposite side of the upper face 31*a*, faces downward and is formed flat. When the first material feeder 14 is at the feed position P1, the lower face 31*b* faces the upper face 25*a* of the platform 25.

The tank 31 is provided with a container 35, a bottom wall 36, and a plurality of feed ports 37. The bottom wall 36 is an example of a first wall and wall, and may be also referred to as a lower part or a bottom part, for example. The feed ports 37 are an example of openings, and may be also referred to as ejection ports, holes, or dropping parts, for example.

The container 35 forms a rectangular parallelepiped-shaped concave part that is communicated with the upper face 31*a* of the tank 31 and that is quadrangular in a plan view. The container 35 has a flat bottom face 35*a*. The bottom face 35*a* is a quadrangular flat face of 250 mm by 250 mm. That is, the area of the bottom face 35*a* of the container 35 is substantially equal to the area of the upper face 25*a* of the platform 25. The shape of the container 35 is not limited to this example.

The container 35 of the first material feeder 14 contains the first material 3 that is powdery. The opening' part of the container 35 (the upper end of the container 35), that is provided in the upper face 31*a* of the tank 31, is left open, but may be blocked with an openable and closable cover, for example.

The bottom wall 36 is a quadrangular plate-shaped part that forms the lower face 3 lb of the tank 31 and the bottom face 35a of the container 35. In other words, the bottom wall 36 is a part of the tank 31 that is present between the lower face 3 lb of tank 31 and the bottom face 35a of the container 35, and is located under the container 35. The first material 3 contained in the container 35 is supported by the bottom wall 36.

The feed ports 37 are each provided in the bottom wall 36. The feed ports 37 have shapes that are substantially the same. The feed ports 37 extend in the direction along the Z-axis and are each communicated with the container 35. The feed ports 37 each have a feed hole 41 and an introducing part 42. The introducing part 42 may be also referred to as a hopper, a funnel part, or a conical part, for example.

The feed hole 41 is a circular hole that is communicated with the lower face 31b of the tank 31. The feed hole 41 is provided from the lower face 31b of tank 31 to a central part in the thickness direction of the bottom wall 36. The diameter of the feed hole 41 is 6 times or more of the particle size of the first material 3 and, for example, is 0.24 mm. The shape and diameter of the feed hole 41 are not limited to this example.

The introducing part 42 forms a conical concave part that is communicated with the bottom face 35a of the container 35. The introducing part 42 is communicated with the feed hole 41. The inner circumferential face of the introducing' part 42 gradually narrows from the opening part in the bottom face 35a downward toward the feed hole 41.

As illustrated in FIG. 3, the feed ports 37 are arranged at substantially uniform intervals in the direction along the X-axis and in the direction along the Y-axis. In other words, the feed ports 37 are arranged in the form of grid points. The feed ports 37 are arranged in the form of a square lattice, but may be arranged in another form, for example, in the form of a rhombic lattice or a regular triangular lattice. The feed ports 37 are not limited to being arranged in the form of grid points, and may be arranged in another form.

The interval (pitch) between any two of the feed ports 37 that are next to each other is, for example, 1 mm. The pitch between the feed ports 37 is not limited to this example. The opening part of each of the introducing parts 42 in the bottom face 35a of the container 35 may be in contact with the opening part of another one of the introducing parts 42 that is next to the each, or may be spaced part therefrom.

As illustrated in FIG. 2, the shutter 32 includes a closure wall 45 and a plurality of communicating holes 46. The closure wall 45 may be also referred to as a closing part or a sliding part, for example. The communicating holes 46 may be also referred to as communicating parts, opening parts, or holes, for example.

The closure wall 45 is a substantially quadrangular plate member that covers the lower face 31b of the tank 31. The shape of the closure wall 45 is not limited to this example. The closure wall 45 has an upper face 45a and a lower face 45b. The upper face 45a is in contact with the lower face 31b of the tank 31. The lower face 45b, which is located on the opposite side of the upper face 45a, faces downward and is formed flat.

When the first material feeder 14 is at the feed position P1, the lower face 45b of the closure wall 45 faces the upper face 25a of the platform 25. The height position in the direction along the Z-axis) of the lower face 45b of the closure wall 45 is substantially equal to the height of the upper end 26a of the circumferential wall 26. Therefore, the closure wall 45 covers the opened upper end 26a of the circumferential wall 26.

The communicating holes 46 are each provided in the closure wall 45. Each of the communicating holes 46 is a circular hole provided from the upper face 45a of the closure wall 45 through to the lower face 45b thereof. The diameter of the communicating hole 46 is, for example, 0.24 mm as in the case of the diameter of the feed hole 41. The shape and diameter of the communicating hole 46 are not limited to this example, and the diameter of the feed hole 41 may be different from the diameter of the communicating hole 46, for example.

The communicating holes 46 are arranged at substantially uniform intervals in the direction along the X-axis and in the direction along the Y-axis as in the case of the feed ports 37. The interval (pitch) between any two of the communicating holes 46 that are next to each other is, for example, 1 mm as in the case of the interval of the feed ports 37. That is, the communicating holes 46 are arranged in the same direction as the feed ports 37 and at the same intervals as the feed ports 37.

The closure wall 45 is movable, for example, along the bottom wall 36 in the direction along the X-axis, with various devices including an actuator. The movement direction of the closure wall 45 is not limited to this example. The closure wall 45 moves between an opening position P5 and a closing position P6, for example. FIGS. 2 and 3 illustrate the closure wall 45 at the opening position P5.

When the closure wall 45 is located at the opening position P5, the respective communicating holes 46 communicate with the feed holes 41 of the corresponding feed ports 37. That is, each of the feed holes 41 is opened by the corresponding communicating hole 46.

Figure 4:
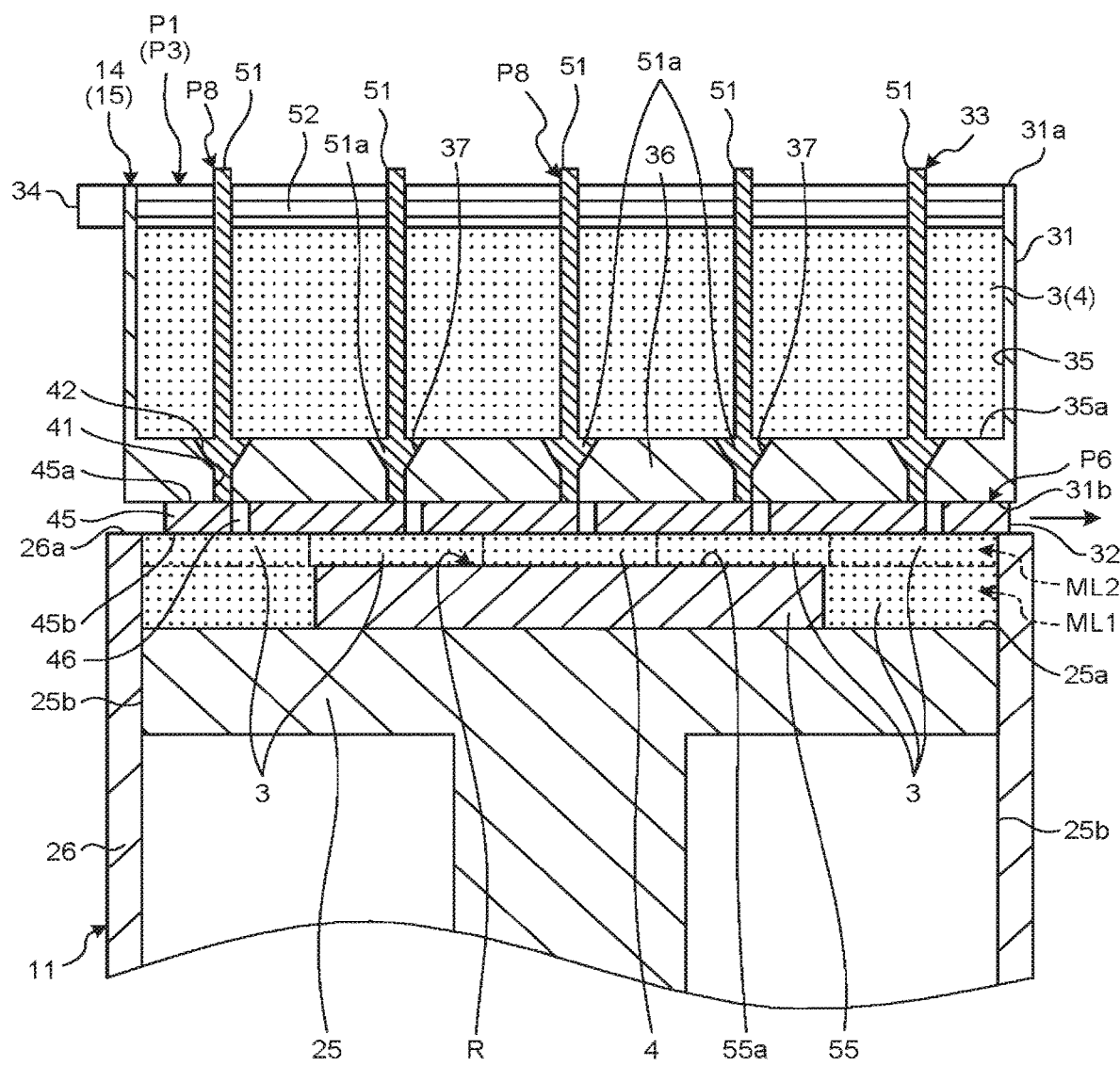
FIG. 4 is a sectional view illustrating the stage and the first material feeder with a closure wall being at a closing position in the first embodiment.

FIG. 4 is a sectional view illustrating a part of the stage 11 and the first material feeder 14 with the closure wall 45 being at the closing position P6. FIG. 4 also illustrates the second material feeder 15 because the second material feeder 15 has the same configuration as the first material feeder 14 as described later.

As illustrated in FIG. 4, when the closure wall 45 is located at the closing position P6, the positions of the communicating holes 46 are shifted from the corresponding feed holes 41 of the feed ports 37. Therefore, the closure wall 45 at the closing position P6 closes the feed holes 41 of the feed ports 37.

The obstructing part 33 includes a plurality of pistons 51 and a supporting member 52. The obstructing part 33 is omitted in FIG. 3. The pistons 51 may be also referred to as structural objects, extruding parts, pressuring parts, insertion parts, or plugs, for example. The supporting member 52 may be also referred to as a joint unit or a moving unit.

Each of the pistons 51 is formed into a rod shape extending in a direction along the Z-axis. Valve parts 51a are provided to the ends of the respective pistons 51 on one side thereof. Each of the valve parts 51a has a shape corresponding to the feed ports 37. That is, the valve part 51a has a rod-shaped part that can fit into one of the feed holes 41 and a conical part that can fit into one of the introducing parts 42.

The pistons 51 are arranged in the container 35 so that the respective valve parts 51a can face the corresponding feed ports 37. The valve parts 51a of the pistons 51 are buried under the first material 3 contained in the container 35. The valve parts 51a may be placed outside the container 35.

The supporting member 52 supports the pistons 51. The pistons 51 supported by the supporting member 52 are arranged at substantially uniform intervals in the direction along the X-axis and in the direction along the Y-axis. That is, the pistons 51 are arranged in the same manner as the feed ports 37 and at the same intervals as the feed ports 37.

The supporting member 52 is capable of individually moving the pistons 51 in the direction along the Z-axis by use of various devices such as an actuator. In other words, the supporting member 52 individually moves the pistons 51 provided with the valve parts 51a, in a direction intersecting the bottom wall 36.

As illustrated in FIG. 2, each of the pistons 51 individually moves, for example, between an opening position P7 and a closing position P8. The piston 51 at the opening position P7 is at a distance from a feed port 37 of the feed ports 37. In other words, the valve part 51a of the piston 51 at the opening position P7 opens the corresponding feed port 37 by being detached from the feed port 37.

The valve part 51a of the piston 51 at the closing position P8 has been fitted into the corresponding feed port 37. The conical part of the valve part 51a is brought into a close contact with the introducing part 42. The valve part 51a that has been moved to the closing position P8 thus closes the feed port 37.

Each of the pistons 51 is individually moved between the opening position P7 and the closing position P8, so that the respective pistons 51 individually open and close the corresponding feed ports 37. The opening and closing of the respective pistons 51 are controlled by, for example, the controller 19.

The first material feeder 14 is moved to the feed position P1 by the first moving device 12. When the first material feeder 14 is at the feed position P1, the closure wall 45 is moved to the opening position P5. In other words, the feed holes 41 of the respective feed ports 37 are opened by the corresponding communicating holes 46.

In addition, when the first material feeder 14 is at the feed position P1, the pistons 51 are selectively moved to the opening positions P7. That is, the pistons 51 selected by the controller 19 are individually moved to the opening positions P7, and the other pistons 51 stay at the closing positions P8. In other words, the feed ports 37 are individually opened by the corresponding pistons 51.

The first material 3 that is powdery contained in the container 35 falls by gravity from the feed ports 37 that have been opened by the communicating holes 46 and the pistons 51, through the communicating holes 46 that communicate with these respective feed ports 37. The first material 3 in the container 35 is guided to the feed holes 41 by sloped inner circumferential faces of the introducing parts 42. The quantity of fall of powder per unit time is, as in the case of an hourglass, substantially constant regardless of the height of the first material 3 contained in the container 35.

The container 35 may be provided with partitioning plates corresponding to the respective feed ports 37. The partitioning plates partition the first material 3 contained in the container 35, and cause the first material 3 to be uniformly guided to the introducing parts 42 of the corresponding feed ports 37.

The vibrator 34 is, for example, a motor that rotates an eccentric weight. The first material feeder 14 is caused to vibrate by the vibrator 34. The first material feeder 14 facilitates falling of the first material 3 in the container 35 from the feed ports 37 and the communicating holes 46 by vibrating. The first material feeder 14 may be provided without the vibrator 34. The first material 3 falls by gravity from the feed ports 37 and the communicating holes 46 without vibration of the vibrator 34.

Detailed description of the second material feeder 15 is omitted because the second material feeder 15 has the same configuration as the first material feeder 14. The second material feeder 15 may have a structure different from that of the first material feeder 14. Differently from the container 35 of the first material feeder 14, the container 35 of the second material feeder 15 contains the second material 4.

The optical device 16 illustrated in FIG. 1 has various parts, such as a light source that has an oscillation element and emits a laser beam. L, a conversion lens that converts the laser beam L into a parallel beam, a converging lens that converges the laser beam, and a galvano mirror that moves an irradiated position of the laser beam L. The optical device 16 is capable of changing the power density of the laser beam L.

The optical device 16 is located above the stage 11. The optical device 16 may be placed at another place. The optical device 16 converts the laser beam L emitted by the light source into a parallel beam with the conversion lens. The optical device 16 irradiates the desired position with the laser beam L by causing the laser beam L to be reflected on the galvano mirror the tilt angle of which is variable and causing the converging lens to converge the laser beam L.

The first material replenishing device 17 is capable of containing a larger quantity of the first material 3 than the container 35 of the first material feeder 14 does. The first material replenishing device 17 is arranged above the standby position P2 and has an openable and closable door. When the first material feeder 14 is at the standby position P2, the door faces the container 35, which is communicated with the upper face 31a of the tank 31.

When the first material feeder 14 is at the standby position P2, the first material replenishing device 17 opens the door and supplies the first material 3 to the container 35. When the first material feeder 14 is not at the standby position P2, the first material replenishing device 17 closes the door to prevent the first material 3 from falling.

The second material replenishing device 18 is capable of containing a larger quantity of the second material 4 than the container 35 of the second material feeder 15 does. The second material replenishing device 18 is arranged above the standby position P4 and has an openable and closable door. When the second material feeder 15 is at the standby position P4, the door faces the container 35, which is communicated with the upper face 31a of the tank 31.

When the second material feeder 15 is at the standby position P4, the second material replenishing device 18 opens the door and supplies the second material 4 to the container 35. When the second material feeder 15 is not at the standby position P4, the second material replenishing device 18 closes the door to prevent the second material 4 from falling.

The controller 19 is electrically connected to the stage 11, the first moving device 12, the second moving device 13, the first material feeder 14, the second material feeder 15, the optical device 16, the first material replenishing device 17, and the second material replenishing device 18. The controller 19 includes various electronic components such as a central processing unit (CPU), a read only memory (ROM), and a random access memory (RAM). The controller 19 controls the stage 11, the first moving device 12, the second moving device 13, the first material feeder 14, the second material feeder 15, the optical device 16, the first material replenishing device 17, and the second material replenishing device 18 by reading and executing computer programs each stored in the ROM or another storage device. The three-dimensional printer 1 manufactures the manufactured object 5, based on the control performed (computer programs executed) by the controller 19.

Described below is an exemplary procedure employed by the three-dimensional printer 1 for manufacturing the manufactured object 5 from the first material 3 and the second material 4 that are powdery. A method employed by the three-dimensional printer 1 for manufacturing the manufactured object 5 is not limited to the method described below.

Figure 5:
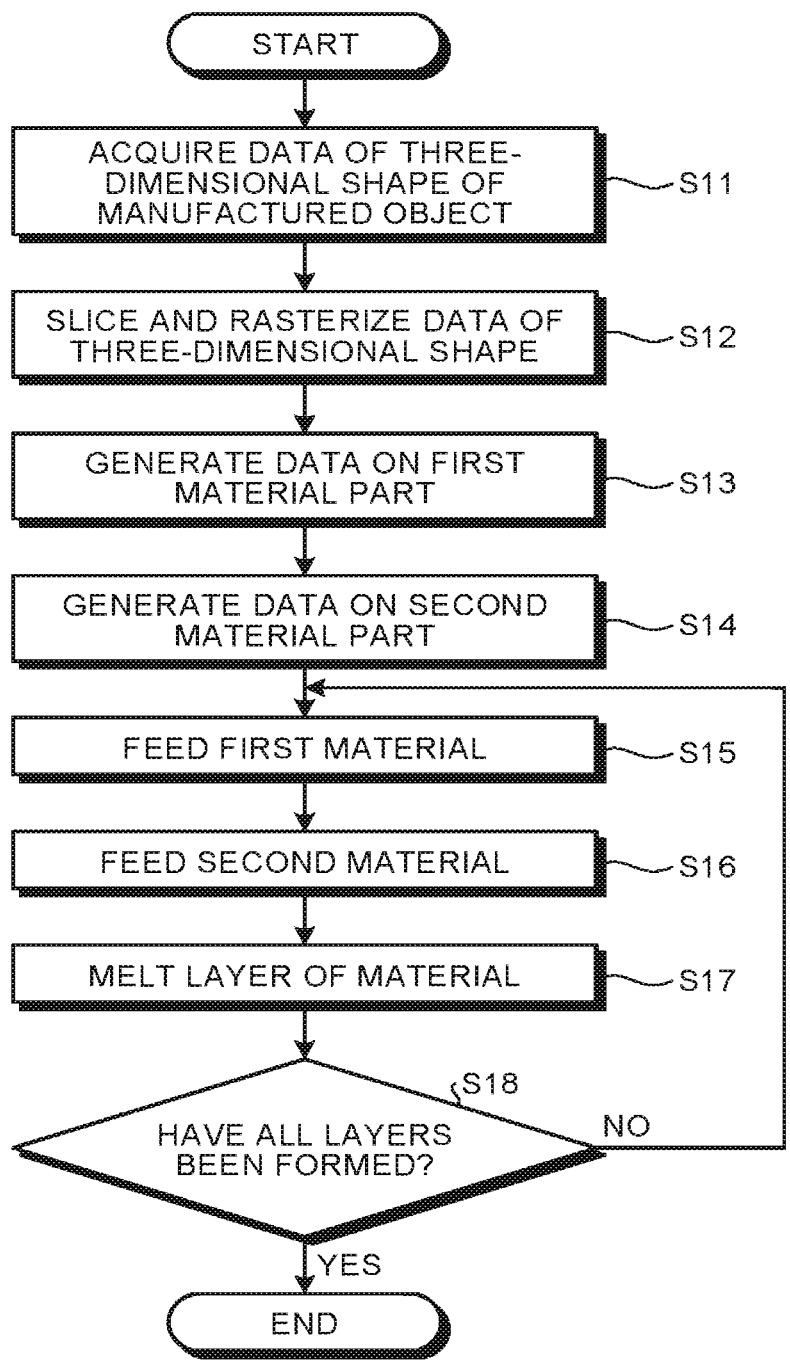
FIG. 5 is a flowchart illustrating an exemplary procedure for manufacturing a manufactured object in the first embodiment.

FIG. 5 is a flowchart illustrating an exempla procedure for manufacturing the manufactured object 5. First, data of the three-dimensional shape of the manufactured object 5 is input to the controller 19 of the three-dimensional printer 1 from, for example, an outside personal computer (S11). The data of the three-dimensional shape is, but not limited to, CAD data.

The data of the three-dimensional shape contains information on material to form parts of the manufactured object 5. That is, the data of the three-dimensional shape contains information on parts (referred to as first material parts 5a below) of the manufactured object 5 to be formed of the first material 3 and on parts (referred to as second material parts 5b below) of the manufactured object 5 to be formed of the second material 4.

Subsequently, the controller 19 divides (slices) the three-dimensional shape of the acquired data into a plurality of layers. The controller 19 converts the sliced three-dimensional shape into groups each consisting of a plurality of points or rectangular parallelepipeds (pixels) (rasterization or pixelation). The controller 19 thus generates data of a plurality of two-dimensionally shaped layers from the acquired data of the three-dimensional shape of the manufactured object 5 (S12). The generated data is stored in a storage unit (not illustrated) of the controller 19.

The interval (pitch) between the adjacent pixels contained in the data of the two-dimensionally shaped layers corresponds to the interval (pitch) between the feed ports 37 next to each other of the first and the second material feeders 14 and 15. That is, when the pitch between the feed ports 37 is 1 mm, each of the pixels in the layers is a quadrangle of 1 mm by 1 mm. The pitch between the adjacent pixels is not limited to this example.

Subsequently, the controller 19 divides the data of the two-dimensionally shaped layers obtained by the slicing, into data of the parts to be formed of the first material 3 and data of the parts to be formed of the second material 4. That is, the controller 19 generates data on the first material parts 5a in the respective layers (S13). The controller 19 further generates data on the second material parts 5b in the respective layers (S14). The generated data is stored in the storage unit of the controller 19.

Subsequently, the first material replenishing device 17 supplies the first material 3 to the container 35 of the first material feeder 14 at the standby position P2. The controller 19 measures the weight of the first material 3 contained in the container 35, for example, by use of sensor, and causes the first material replenishing device 17 to supply the first material 3 to the container 35 until the weight thereof reaches a certain value. Consequently, the container 35 contains a certain quantity of the first material 3. When the container 35 already contains the certain quantity of the first material 3, supply of the first material 3 by the first material replenishing device 17 may be skipped.

Similarly, the second material replenishing device 18 supplies the second material 4 to the container 35 of the second material feeder 15 at the standby position P4. When the container 35 already contains the certain quantity of the second material 4, supply of the second material 4 by the second material replenishing device 18 may be skipped.

The closure wall 45 of the first material feeder 14 is normally at the closing position P6. In addition, the pistons 51 of the first material feeder 14 are normally at the closing positions P8. Therefore, the feed ports 37 are closed by the closure wall 45 and the pistons 51, so that the first material 3 contained in the container 35 is prevented from falling from the feed ports 37. The second material 4 is similarly prevented from falling also in the second material feeder 15.

Subsequently, the first moving device 12 moves the first material feeder 14 from the standby position P2 to the feed position P1. Upon arriving at the feed position P1, the first material feeder 14 feeds the first material 3 to the stage 11, in a manner described below (S15).

As illustrated in FIG. 2, a base 55 is mounted on and fixed to the upper face 25a of the platform 25 of the stage 11. The base 55 is provided so that the manufactured object 5 can be manufactured on the base 55. The manufactured object 5 may be manufactured directly on the upper face 25a of the platform 25 without the base 55 being placed on the upper face 25a of the platform 25.

The base 55 is a quadrangular plate material, for example. The shape of the base 55 is not limited to this example, and is determined depending on the shape of the manufactured object 5. The base 55 has a flat upper face 55a. The upper face 55a of the base 55 is parallel to the upper face 25a of the platform 25.

In the first place, the platform 25 of the stage 11 is placed so that the distance between the upper face 55a of the base 55 and the upper end 26a of the circumferential wall 26 in the direction along the Z-axis is 50 μm. Therefore, the distance between the upper face 55a of the base 55 and the lower face 45b of the closure wall 45 of the first material feeder 14 at the feed position P1 is 50 μm.

Before the manufacturing, a part surrounding the base 55 is entirely covered by the first material 3. The part may be covered by the second material 4 instead of the first material 3. A surface 3a of the first material 3 thus overlaid is on substantially the same plane as the upper face 55a of the base 55. Consequently, the first material 3 and the base 55 form a layer ML1 on the upper face 25a of the platform 25.

The surface 3a of the first material 3 and the upper face 55a of the base 55, that forms the layer ML1, form a feed region R. The feed region R is an example of a region to which material is fed. Feed regions R are also formed by a plurality of layers ML2, ML3, ML4, and so on of the first material 3, which are successively deposited on the layer ML1, as described below.

The feed region R is a substantially flat, quadrangular face of 250 mm by 250 mm as in the case of the upper face 25a of the platform 25. The shape of the feed region R may be different from the shape of the upper face 25a of the platform 25. The distance between the feed region R and the lower face 45b of the closure wall 45 of the first material feeder 14 at the feed position P1 is 50 μm. The distance between the feed region R and the lower face 45b of the closure plate 45 may be changed to, for example, 30 μm and 100 μm with the controller 19 controlling the platform 25. The feed region R is surrounded by the circumferential wall 26.

The bottom wall 36 of the first material feeder 14 at the feed position P1 is located above the feed region R. The bottom wall 36 covers the entirety of the feed region R. The bottom wall 36 may partially cover the feed region R. The lower face 31b of the tank 31 and the lower face 45b of the closure wall 45 face the feed region R.

As illustrated in FIG. 3, the feed region R is defined as a region having a plurality of divided sections RD1 and RD2 in the present specification. The divided sections RD1 and RD2 are an example of a plurality of sections. The divided sections RD1 and RD2 are quadrangular sections, for example. Each of the divided sections RD1 and RD2 is not limited to this example, and may have another shape.

The areas of the divided sections RD1 and RD2 are equal to one another. The divided sections RD1 and RD2 are arranged in the direction along the X-axis and in the direction along the Y-axis. The feed ports 37 and the communicating holes 46 face the corresponding' divided sections RD1 and RD2. That is, the respective feed ports 37 and the respective communicating holes 46 are located above the corresponding divided sections RD1 and RD2, and oppose (face) these divided sections RD1 and RD2.

The divided sections RD1 correspond to the data on the first material parts 5a in the respective layers that has been generated by the controller 19. That is, a plurality of pixels that form the data on the first material parts 5a correspond to a plurality of divided sections RD1.

The divided sections RD2 correspond to the data on the second material parts 5b in the respective layers that has been generated by the controller 19. That is, a plurality of pixels that form the data on the second material parts 5b correspond to a plurality of divided sections RD2. In FIG. 3, the divided sections RD2 are illustrated with hatched lines.

As illustrated in FIG. 2, when the first material feeder 14 arrives at the feed position P1, the controller 19 moves the closure wall 45 to the opening position P5. Consequently, the communicating holes 46 of the shutter 32 communicate with the feed holes 41 of the feed ports 37.

The controller 19 further moves, to the opening positions P7, the pistons 51 that close the feed ports 37 that correspond to the divided sections RD1. Consequently, the feed ports 37 that correspond to the divided sections RD1 are opened by the communicating holes 46 and the pistons 51. In other words, only the feed ports 37 that are opposed to the divided sections RD1 are opened. The feed ports 37 that correspond to the divided sections RD2 are kept closed by the pistons 51.

The first material feeder 14 is caused to vibrate by the vibrator 34. The first material 3 in the container 35 falls onto the feed region R through the feed ports 37 and communicating holes 46 that have been opened by the pistons 51. The first material feeder 14 feeds the first material 3 onto the feed region R concurrently from at least one of the feed ports 37 that has been opened.

The opened feed ports 37 feeds the first material 3 onto the corresponding divided sections RD1. FIG. 3 illustrates fall spots S of the first material 3 that has fallen from the respective feed ports 37 and the respective communicating holes 46. The fall spots S is in the divided sections RD1 that correspond to the feed ports 37 and the communicating holes 46 that have been opened.

While the first material 3 is fed to the feed region R from the feed ports 37 and communicating holes 46, the first material feeder 14 is moved, for example, by the first moving device 12, in the direction along the X-axis and in the direction along the Y-axis, as indicated by the arrow in FIG. 3. Consequently, each fall spot S to which the first material 3 falls from the corresponding feed port 37 and communicating hole 46 moves within the corresponding divided section RD1, as indicated by the arrow in FIG. 3. The fall spot S moves within the divided section RD1 so as to trace with a single stroke. Therefore, the first material 3 is substantially evenly fed to the respective divided sections RD1.

A layer of the first material 3 is formed on of the feed region R partially with the first material 3 fed onto the respective divided sections RD1. In other words, the layer of the first material 3 is placed on the layer ML1.

When the first material 3 is fed on the feed region R, the first material 3 thus fed touches the lower face 45b of the closure wall 45. At positions where the first material 3 has been fed, the communicating holes 46 are closed the first material 3.

The controller 19 counts a time that has elapsed since the opening of the feeds port 37 with the closure wall 45 having moved to the opening position P5, using a timer, for example. When a certain time has passed since the opening of the feed ports 37, the controller 19 moves the closure wall 45 from the opening position P5 to the closing position P6, thereby causing the closure wall 45 to close the feed ports 37. The falling velocity of powder that passes through the feed ports 37 is substantially constant, and the quantities of fall thereof can be controlled with times for which the feed ports 37 are opened.

In contrast, the pistons 51 that have been moved to the opening positions P7 gradually move toward the closing positions P8. Each of the valve parts 51a of the respective pistons 51 that move from the opening positions P7 to the closing positions P8 pushes the first material 3 situated between this valve part 51a and the corresponding feed port 37 toward the feed port 37. Consequently, the first material 3 is extruded from the feed ports 37 by the pistons 51 and fed onto the feed region R.

When a certain time has passed since the moving of the pistons 51 to the opening positions P7, the pistons 51 that move to the closing positions P8 arrive at the closing positions P8. The first material 3 inside the feed holes 41 are extrude from inside the feed holes 41 by the valve parts 51a of the pistons 51.

As illustrated in FIG. 4, when having arrived at the closing positions P6, the valve parts 51a of the pistons 51 fit into the feed ports 37, thereby closing the feed ports 37. That is, when the certain time has passed since the opening of the feed ports 37 by the pistons 51, the valve parts 51a of the pistons 51 close the feed ports 37. Consequently, the first material 3 is fed onto the feed region R. The pistons 51 close the feed ports 37 before the closure wall 45 closes the feed ports 37.

As described above, when the layer of the first material 3 has been formed on the feed region R, the lower face 45b of the closure wall 45 presses the surface of the first material 3. Consequently, the first material 3 fed thereon is leveled. After the layer of the first material 3 has been formed, the first moving device 12 moves the first material feeder 14 from the feed position P1 to the standby position P2.

Figure 6:
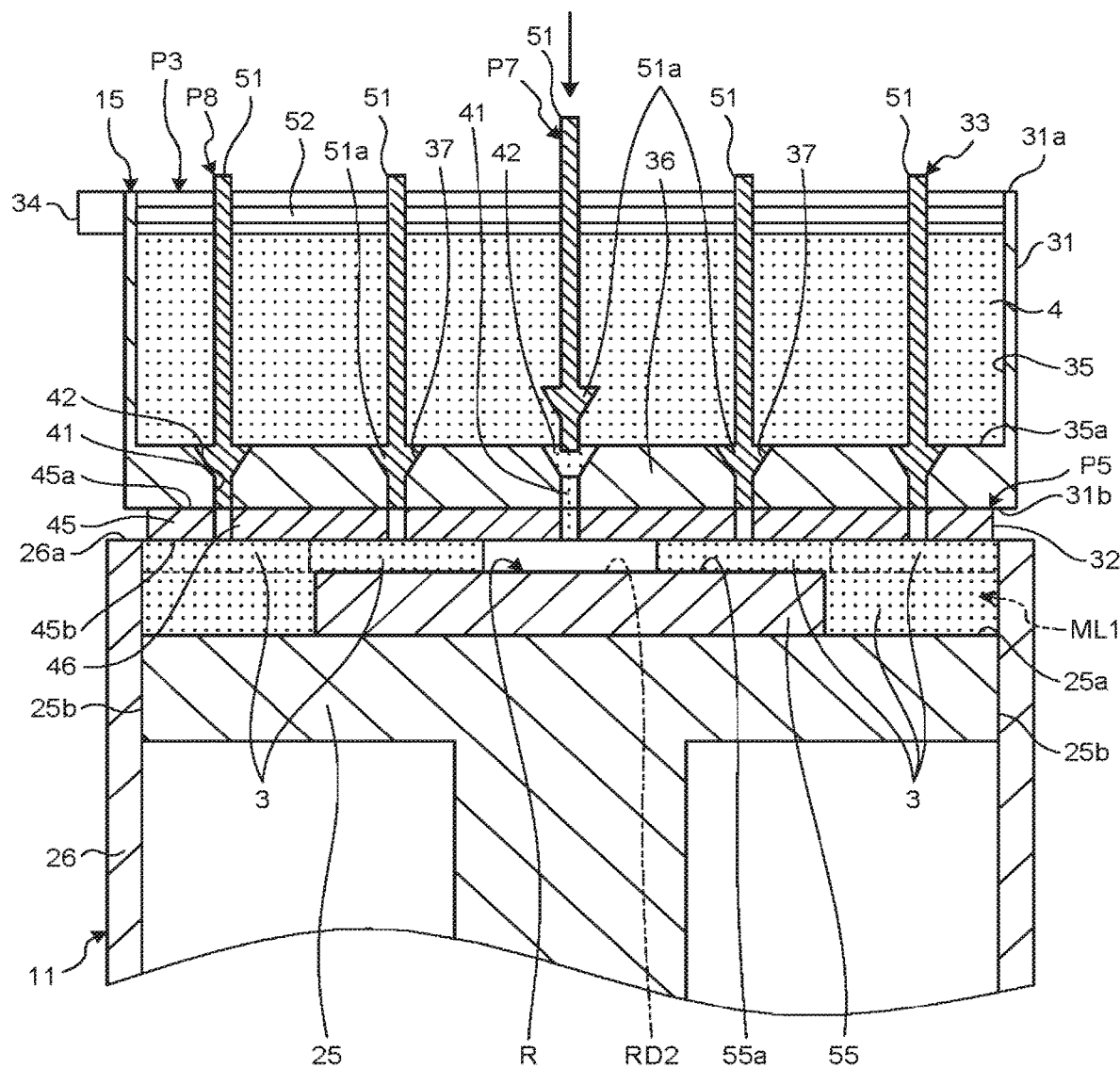
FIG. 6 is a sectional view illustrating the stage and a second material feeder in the first embodiment.

Subsequently, the second moving device 13 moves the second material feeder 15 from the standby position P4 to the feed position P3. FIG. 6 is a sectional view illustrating a part of the stage 11 and the second material feeder 15. As illustrated in FIG. 6, upon arriving at the feed position P3, the second material feeder 15 feeds the second material 4 onto the stage 11 in the same manner as the first material feeder 14 does (S16).

The controller 19 moves, to the opening positions P7, the pistons 51 of the second material feeder 15 that close the feed ports 37 that correspond to the divided sections RD2. Consequently, the feed ports 37 that correspond to the divided sections RD2 are opened by the communicating holes 46 and the pistons 51. In other words, only the feed ports 37 that are opposed to the divided sections RD2 are opened. The feed ports 37 that correspond to the divided sections RD1 are kept closed by the pistons 51.

The second material 4 contained in the container 35 of the second material feeder 15 falls onto the feed region R through the feed ports 37 and communicating holes 46 that have been opened by the pistons 51. The second material feeder 15 feeds the second material 4 onto the feed region R concurrently from at least one of the feed ports 37 that has been opened.

The opened feed ports 37 feeds the second material 4 onto the corresponding divided sections RD2. As illustrated in FIG. 4, a continuous layer ML2 of the first material 3 and the second material 4 is formed on the feed region R with the second material 4 fed onto the respective divided sections RD2. In other words, the layer of the first material 3 and a layer of the second material 4 are combined, and the layer ML2 of the first material 3 and the second material 4 is formed. The quantity of the first material 3 fed to each of the divided sections RD1 and the quantity of the second material 4 fed to each of the divided sections RD2 are substantially the same. Therefore, the thickness of the layer ML2 formed on the feed region R is substantially uniform across locations.

When the layer ML2 of the first material 3 and the second material 4 has been formed, the lower face 45b of the closure wall 45 presses the surface of the layer ML2. Consequently, the surface of the formed layer ML2 is leveled. After the layer ML2 is formed, the second moving device 13 moves the second material feeder 15 from the feed position P3 to the standby position. P4. When the second material feeder 15 moves from the feed position P3 to the standby position P4, the lower face 45b of the closure wall 45 may level the surface of the layer ML2 by sliding on the surface of the layer ML2 that makes contact with the lower face 45b.

Subsequently, as illustrated in FIG. 1, the controller 19 controls the optical device 16 to irradiate the first material 3 that forms the layer ML2, with a laser beam L from the optical device 16 (S17). The controller 19 sets irradiation positions of the laser beam L, based on the input data of the three-dimensional shape of the manufactured object 5.

Parts irradiated with the laser beam L of the layer ML2 of the first material 3 and the second material 4 melt. In other words, the first material 3 and the second material 4 are partially melted and then solidified by being irradiated with the laser beam L. Consequently, a part (one-layer portion) of the manufactured object 5 is formed in the layer ML2 of the first material 3 and the second material 4. A formed part of the manufactured object 5 corresponds to the data on one of the two-dimensionally shaped layer that has been generated by the controller 19. Alternatively, the first material 3 and the second material 4 may be sintered.

While the layer ML2 is irradiated with the laser beam L, the first material replenishing device 17 supplies the first material 3 to the container 35 of the first material feeder 14. Similarly, the second material replenishing device 18 supplies the second material 4 to the container 35 of the second material feeder 15. The volumes of the first material 3 and the second material 4 contained in the respective containers 35 are each larger than the volume of the layer ML2 formed on the feed region R.

When the optical device 16 has completed irradiation of the first material 3 in the layer ML2 with the laser beam L, the platform 25 moves downward by, for example 50 μm. The distance by which the platform 25 moves equals to the thickness of the layer ML2. Consequently, the distance between the surface of the layer ML2 and an upper end 26a of the circumferential wall 26 becomes 50 μm.

The surface of the first material 3 and second material 4 forming the layer ML2 and the surface of the part of the manufactured object 5 formed in the layer ML2 form a feed region R in the layer ML2. When the manufactured object 5 is incomplete (NO at S18), the first moving device 12 again moves the first material feeder 14 to the feed position P1. While being at the feed position P1, the first material feeder 14 feeds the first material 3 onto the feed region R formed by the layer ML2 (S15).

Figure 7:
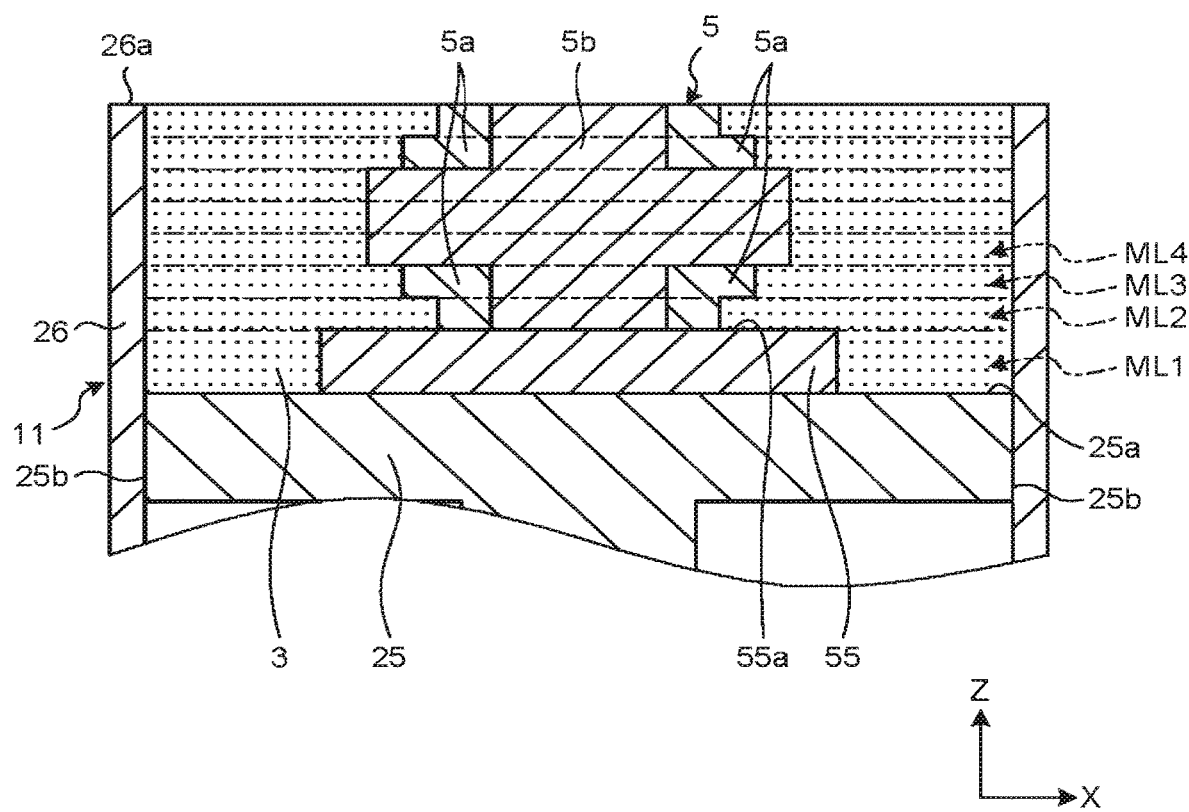
FIG. 7 is a sectional view illustrating the stage that has the manufactured object manufactured thereon, in the first embodiment.

FIG. 7 is a sectional view illustrating the stage 11 that has the manufactured object 5 manufactured thereon. The first material feeder 14 and the second material feeder 15 feed the first material 3 and the second material 4 onto each feed region R in the same manner as described above (S15 and S16), thereby sequentially forming a plurality of layers ML2, ML3, ML4, and so on of the first material 3 and the second material 4 such as those illustrated in FIG. 7. In FIG. 7, the boundaries between adjacent ones of the layers ML2, ML3, ML4, and so on are marked by long dashed double-dotted lines.

Each time one of the layers ML2, ML3, ML4, and so on is formed, the optical device 16 partially melts the first and second material 3 and 4 of the one of the layers ML2, ML3, ML4, and so on, thereby forming a part of the manufactured object 5 (S17). The manufactured object 5 includes the first material part 5a formed by melting the first material 3, and the second material part 5b formed by melting the second material 4.

The three-dimensional printer 1 manufactures the three-dimensionally shaped manufactured object 5 by repeating formation of each of the layers ML2, ML3, ML4, and so on of the first and second material 3 and 4 by the first and second material feeders 14 and 15 and melting of the first material 3 by the optical device 16. When the respective parts (respective layers) of the manufactured object 5 that correspond to the data on all of the two-dimensionally shaped layers that has been generated by the controller 19 have been formed (YES at S18), manufacturing of the manufactured object 5 is complete.

Figure 8:
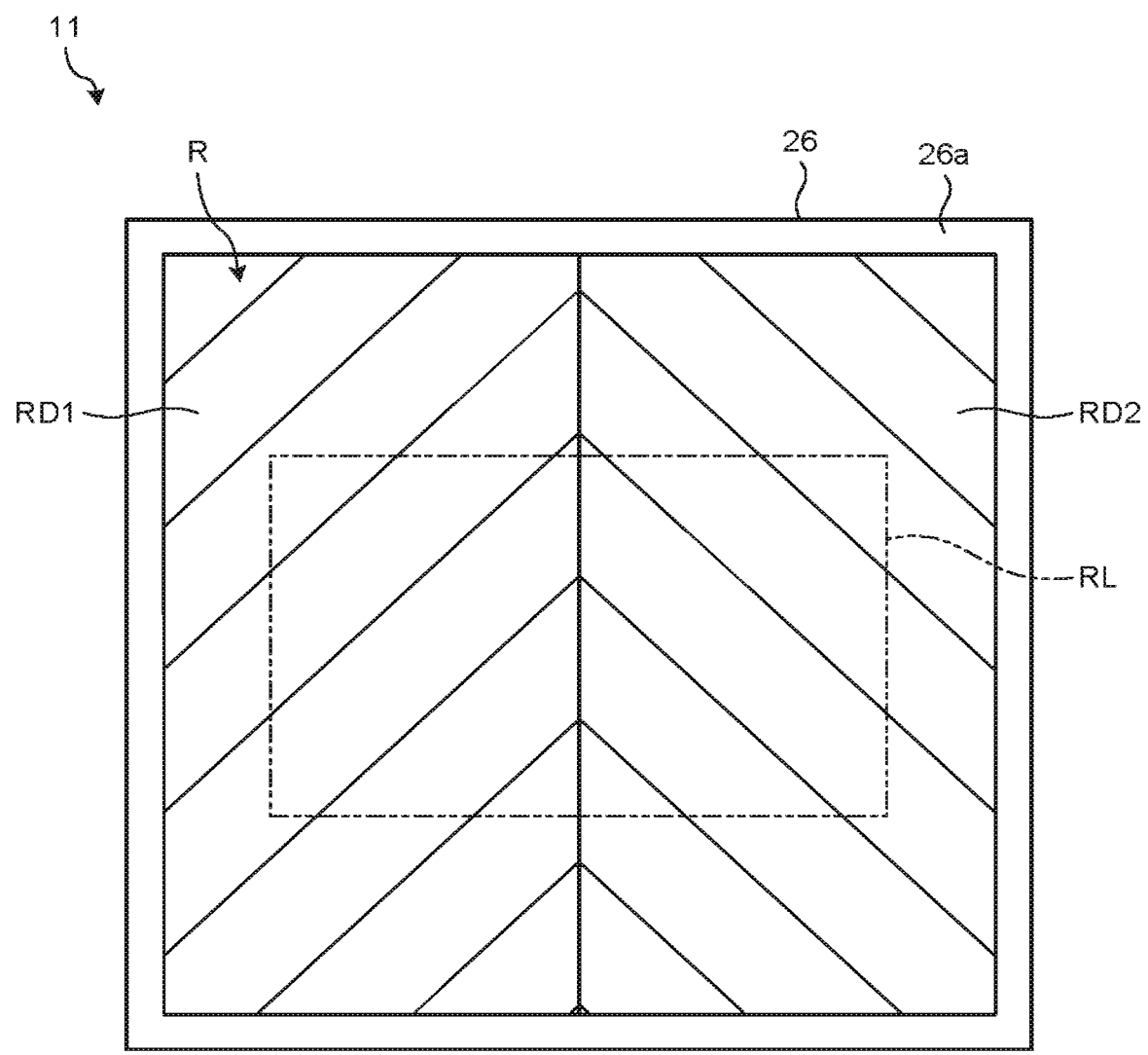
FIG. 8 is a plan view illustrating a feed region R in a first example in the first embodiment.

Here, description is given of an example of the arrangement of the divided sections RD1 onto which the first material 3 is fed and the divided sections RD2 onto which the second material 4 is fed. FIG. 8 is a plan view illustrating a feed region R in a first example. In FIG. 8, a region (hereinafter referred to as an irradiation region) RL to be irradiated with the laser beam L is indicated by long dashed double-dotted lines. The irradiation region RL is an example of a part to be solidified. Further in FIG. 8, the divided section. RD1 and the divided section RD2 are indicated by different hatched lines.

As illustrated in FIG. 8, in the first example, the irradiation region RL is formed of a part of the divided section RD1 and a part of the divided section RD2. That is, the irradiation region RL is divided into parts belonging to the divided section RD1 and the divided section. RD2. In the first example, the boundary between the parts belonging to the divided section RD1 and the divided section RD2 extends from one of ends to another of the ends, of the irradiation region RL.

The arrangement of the divided section RD1 inside the irradiation region RL corresponds to the above described data on the first material part 5a, which is generated by the controller 19 (S13). The arrangement of the divided section RD2 in the irradiation region RL corresponds to the above described data on the second material part 5b, which is generated by the controller 19 (S14).

The controller 19 sets up the boundary between the divided section RD1 and the divided section RD2 outside the irradiation region RL by extending the boundary between the divided section RD1 and the divided section RD2 inside the irradiation region RL. That is, the boundary between the divided section RD1 and the divided section RD2 outside the irradiation region RL continues into the boundary between the divided section RD1 and the divided section RD2 inside the irradiation region RL. Therefore, the feed region R outside the irradiation region RL is also divided into parts belonging to the divided section RD1 and the divided section RD2.

The first material feeder 14 feeds the first material 3 onto the divided section RD1 inside the irradiation region RL as well as onto the divided section RD1 outside the irradiation region RL. In addition, the second material feeder 15 feeds the second material 4 onto the divided section RD2 inside the irradiation region RL as well as onto the divided section RD2 outside the irradiation region RL. Thereafter, the optical device 16 irradiates the irradiation region RL with the laser beam L, thereby melting and solidifying the first material 3 and the second material 4 fed onto the irradiation region RL. Consequently, a part (one-layer portion) of the manufactured object 5 is formed.

In the first example, when manufacturing of the manufactured object 5 is complete, the manufactured object 5 is surrounded by the first material 3 and the second material 4 that are powdery. The manufactured object 5 is taken out by removing the first material 3 and the second material 4 that are powdery.

Figure 9:
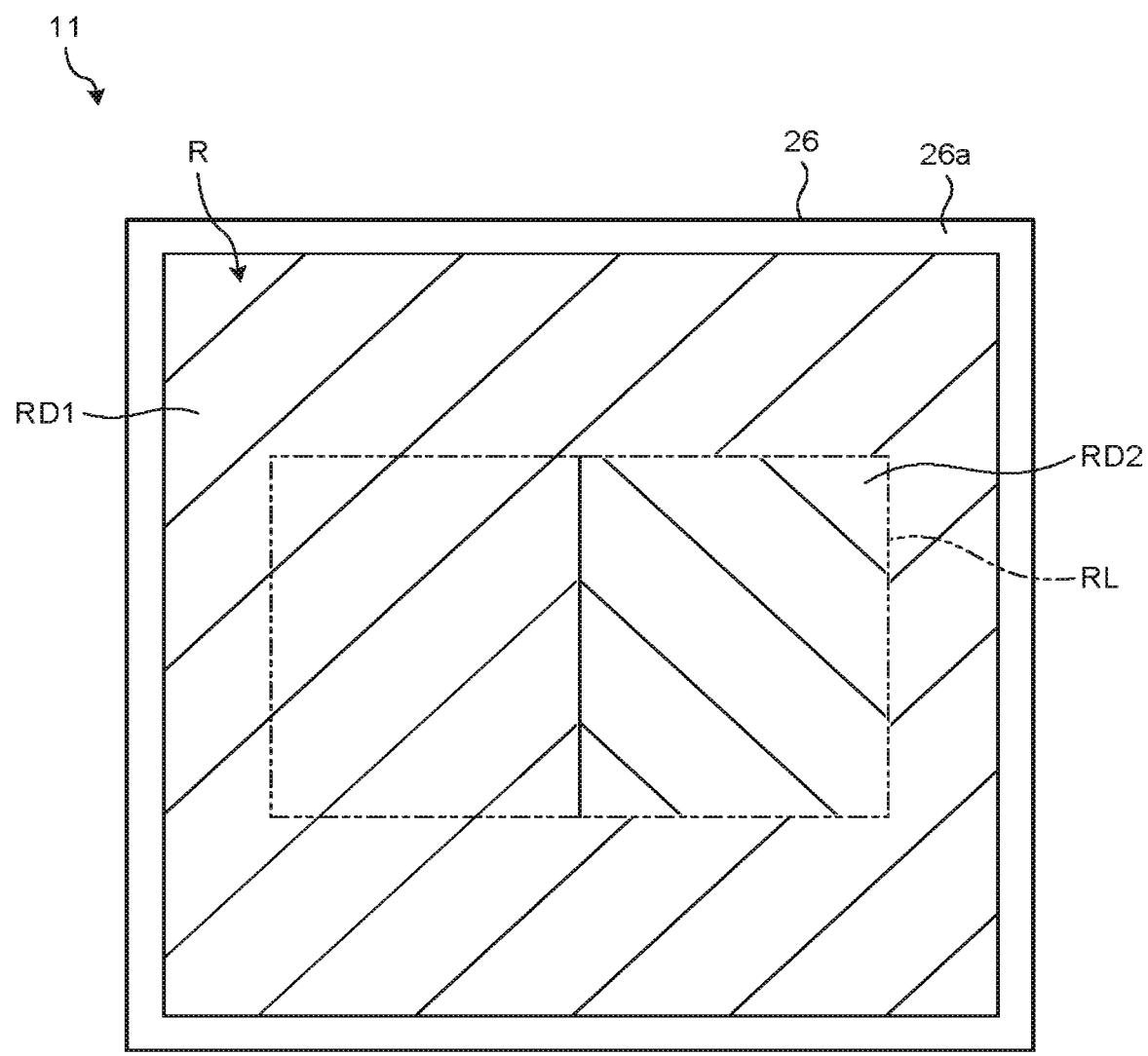
FIG. 9 is a plan view illustrating a feed region R in a second example in the first embodiment.

FIG. 9 is a plan view illustrating a feed region R in a second example. As illustrated in FIG. 9, in the second example, the irradiation region RL is divided into parts belonging to the divided section RD1 and the divided section RD2. In contrast, the controller 19 determines the arrangement of the divided section RD1 and the divided section RD2 so that a part of the feed region R outside the irradiation region RL can be formed only of the divided section RD1. In this case, a part of the boundary between the divided section RD1 and the divided section RD2 overlaps the boundary of the irradiation region RL.

The first material feeder 14 feeds the first material 3 onto the divided section RD1 inside the irradiation region RL as well as onto the divided section RD1 outside the irradiation region RL. In addition, the second material feeder 15 feeds the second material 4 onto the divided section RD2 inside the irradiation region RL. That is, only the first material 3 is fed to the outside of the irradiation region RL.

In the second example, when manufacturing of the manufactured object 5 is complete, the manufactured object 5 is surrounded only by the first material 3 that is powdery. The manufactured object 5 is taken out by removing the first material 3 that is powdery. The first material 3 that is powdery is, for example, suctioned or caused to freely fall to be collected into a tank that contains the first material 3. The first material 3 thus collected is supplied to the first material replenishing device 17 and reused.

Figure 10:
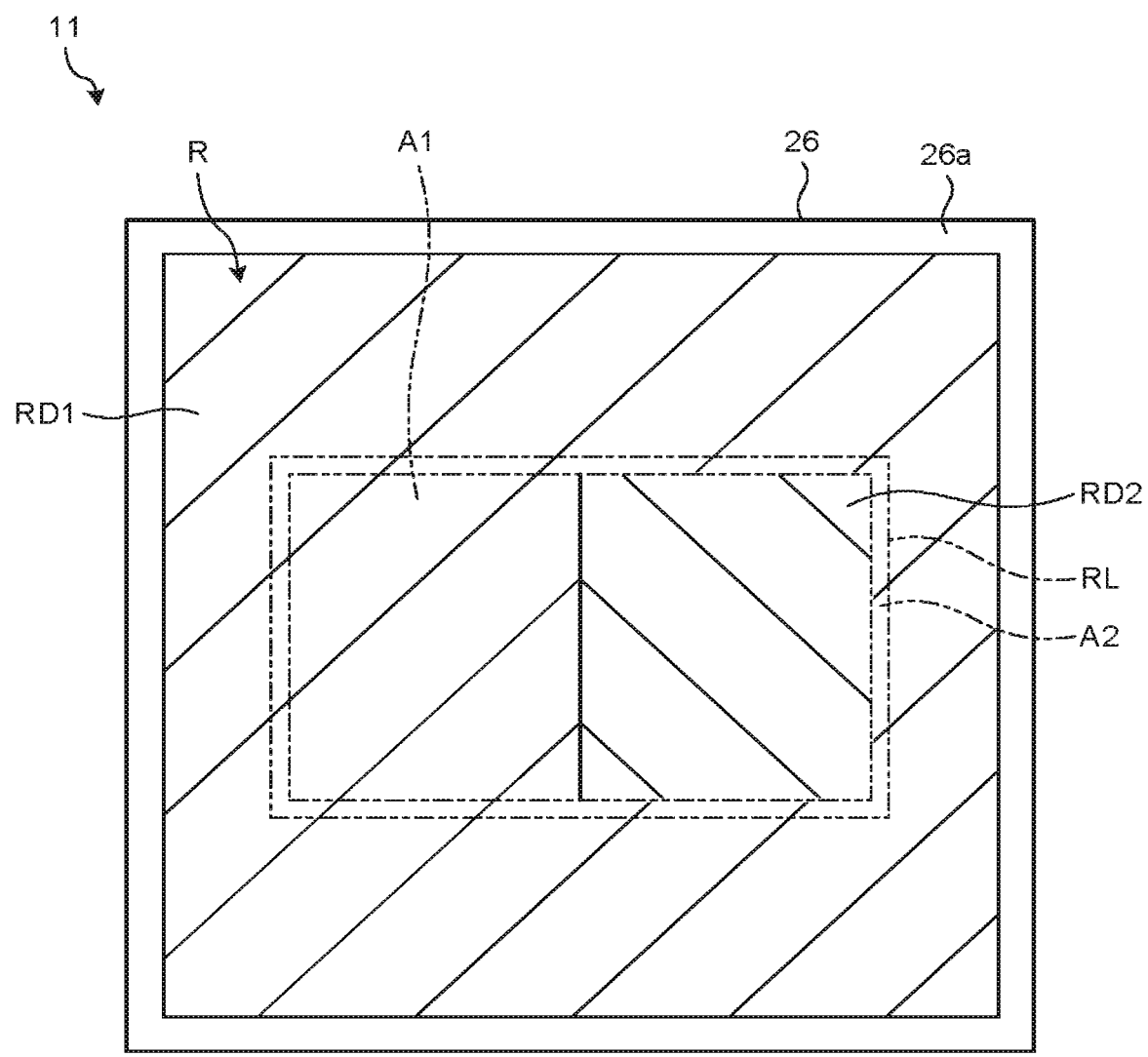
FIG. 10 is a plan view illustrating a feed region R in a third example in the first embodiment.

FIG. 10 is a plan view illustrating a feed region R in a third example. As illustrated in FIG. 10, in the third example, the controller 19 defines a manufactured object section A1 and an outer edge section A2 inside the irradiation region RL. The manufactured object section A1 is a section that is melted by the laser beam L to form a part of the manufactured object 5. The outer edge section A2 is a section surrounding the manufactured object section A1. In other words, the controller 19 provides, to the outside of a section in which a part of the manufactured object 5 is formed, a section to be melted by the laser beam L.

The manufactured object section A1 is divided into a part of the divided section RD1 and the divided section RD2. In contrast, the controller 19 defines the arrangement of the divided section RD1 and the divided section RD2 so that the outer edge section A1 can be formed only of the divided section RD1.

The boundary of the irradiation region RL is arranged at a more exterior location than the boundary between the divided section RD1 and the divided section RD2. That is, the divided section RD2 is arranged in a more interior location than the boundary of the irradiation region RL. In other words, in the irradiation region RL, a divided region RD2 is surrounded by a divided region RD1.

The first material feeder 14 feeds the first material 3 to the divided section RD1 inside the manufactured object section A1, the outer edge section A2, and the divided section RD1 outside the irradiation region RL. In addition, the second material feeder 15 feeds the second material 4 to the divided section RD2 inside the manufactured object section A1. That is, only the first material 3 is fed to the outside of the irradiation region RL and the outer edge section A2.

In the third example, when manufacturing of the manufactured object 5 is complete, the manufactured object 5 is covered by the first material 3 in the outer edge section A2 that has been melted. The first material 3 covering the manufactured object 5 is removed by various processes such as polishing, cutting, and laser machining. Consequently, the manufactured object 5 is formed.

Also in the third example, the first material 3 that is powdery is, for example, suctioned or caused to freely fall to be collected into a tank that contains the first material 3. The first material 3 thus collected is supplied to the first material replenishing device 17 and reused.

The manufactured object 5, which has been manufactured in the inside of the treatment tank 10, is taken out of the treatment chamber 10a by, for example, opening a cover provided to the treatment tank 10. This example is not limiting, and the manufactured object 5 may be conveyed to the outside of the treatment chamber 10a by a conveying device having a conveyance arm and other components, for example. The manufactured object 5 is conveyed to a room (an antechamber) that is isolated from the treatment chamber 10a by an openable and closable door, for example.

In the three-dimensional printer 1 according to the first embodiment, the first and the second material feeders 14 and 15 includes the obstructing part 33 capable of individually opening and closing the feed ports 37. A layer of the first or the second material 3 or 4 is formed at least partially on each feed region R by feeding the first or the second material 3 or 4 from at least one of the feed ports 37 that has been opened by the obstructing part 33. Consequently, a layer of powdery material (the first material 3 or the second material 4) can be formed in accordance with features of the manufactured object 5. For example, the layers ML2, ML3, ML4, and so on each using plurality of kinds of material (the first material 3 and the second material 4) can be formed. When the manufactured object 5 of a small size is manufactured, layers of material (the first material 3 or the second material 4) are formed on feed regions R that are smaller than the platform 25, so that excessive use of the material can be suppressed.

To each of the divided sections RD1 and RD2, either of the first material feeder 14 and the second material feeder 15 feeds either of the first material 3 and the second material 4 from the feed port 37 corresponding' to the each of the divided sections RD1 and RD2. The successive layer ML2, ML3, ML4, and so on using a plurality of kinds of material (the first material 3 and the second material 4) are formed on feed regions R with the first material 3 and the second material 4. Consequently, the manufactured object 5 formed of a plurality of kinds of material (the first material 3 and the second material 4) can be more efficiently manufactured by the additive manufacturing.

Only the first material 3 is fed to the outside of the irradiation region RL. Consequently, when the first material 3 that is powdery is collected, mixing of the second material 4 into this first material 3 can be suppressed. Therefore, the first material 3 can be reused.

Only the first material 3 is fed to the outer edge section A2 surrounding the manufactured object section A1 and to the outside of the irradiation region RL. The second material 4 fed onto the feed region R is fed only to the manufactured object section A1 and is located in a more interior location than the boundary of the irradiation region RL, thereby being to be all melted. The first material 3 in the outer edge section A2 is removed after the manufactured object 5 is manufactured. Consequently, when the first material 3 that is powdery is collected, mixing of the second material 4 into this first material 3 can be more reliably suppressed.

Hereinafter, a second embodiment will be described with reference to FIG. 11 and FIG. 12. In the description of the following embodiments, a component having the same function as any one of the aforementioned components has the same reference sign as that component, and the description thereof may be omitted. Furthermore, the components with the same reference sign do not necessarily have all functions and properties in common, but may have different functions and properties according to each embodiment.

Figure 11:
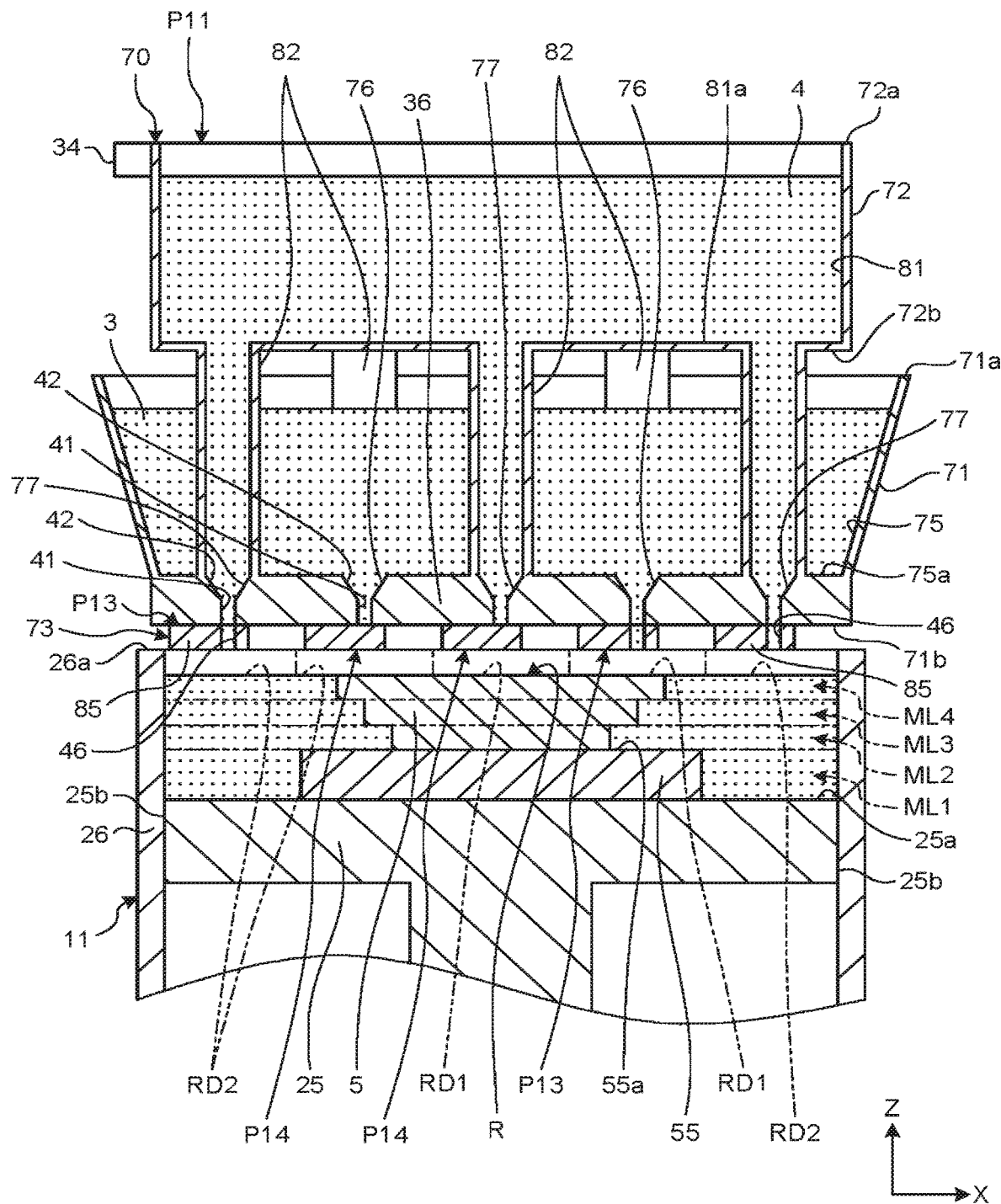
FIG. 11 is a sectional view illustrating a stage and a material feeder at a first position in the second embodiment.

FIG. 11 is a sectional view illustrating the stage 11 in the second embodiment and a material feeder 70 at a first position P11. FIG. 12 is a sectional view illustrating a part of the stage 11 and the material feeder 70 at a second position P12.

In the second embodiment, the three-dimensional printer 1 includes the material feeder 70 in place of the first material feeder 14. The three-dimensional printer 1 in the second embodiment does not include the second moving device 13 and the second material feeder 15, and forms the layers ML2, ML3, ML4, and so on of the first material 3 and the second material 4 with the single material feeder 70.

As illustrated in FIG. 11, the material feeder 70 includes a first tank 71, a second tank 72, an opening-closing part 73, and the vibrator 34. The opening-closing part 73 may be also referred to as an obstructing part, a shutoff part, an adjustment part, or a regulation part.

The first tank 71 is formed substantially in a frustum shape. The first tank 71 has an upper face 71a facing upward and a lower face 71b facing downward. The upper face 71a and the lower face 71b are each formed flat. When the material feeder 70 is at the feed position. P1, the lower face 71b faces a fed region R.

The first tank 71 is provided with the bottom wall 36, a first container 75, a plurality of first feed ports 76, and a plurality of second feed ports 77. Each of the first feed port 76 is an example of a first opening. Each of the second feed port 77 is an example of a second opening.

The first container 75 forms a frustum-shaped concave part opening to the upper face 71a of the first tank 71. The first container 75 has a bottom face 75a formed by the bottom wall 36. The area of the bottom face 75a is substantially the same as the area of a feed region R. The first container 75 contains the first material 3.

The first feed ports 76 and the second feed ports 77 are each provided in the bottom wall 36. The first feed ports 76 and the second feed ports 77 each have the same shape as each of the feed ports 37 in the first embodiment. That is, the first feed ports 76 and the second feed ports 77 are formed into substantially the same shape and each have the feed hole 41 and the introducing part 42.

The first feed ports 76 and the second feed ports 77 are arranged in the form of grid points. In addition, the first feed ports 76 and the second feed ports 77 are alternately arranged. The arrangement of the first feed ports 76 and the second feed ports 77 is not limited to this example.

The second tank 72 is formed into a substantially quadrangular box shape, and has an upper face 72a facing upward and a lower face 72b facing downward. The upper face 72a and the lower face 72b are each formed flat. The second tank 72 is arranged above the first tank 71. Therefore, the lower face 72b faces the first tank 71.

The second tank 72 is provided with a second container 81. The second container 81 forms a rectangular parallelepiped-shaped concave part that is communicated with the upper face 72a of the second tank 72 and that is quadrangular in a plan view. The second container 81 has a flat bottom face 81a. The area of the bottom face 81a is substantially the same as the area of a feed region R. The second container 81 contains the second material 4.

The first container 75 formed into a frustum shape projects laterally (in the directions along the X-axis and the Y-axis) from the second tank 72. Therefore, the first container 75 is capable of receiving material feeding from the first material replenishing device 17.

The first feed ports 76 are communicated with the bottom face 75a of the first container 75. That is, the first feed ports 76 are communicated with the first container 75. The first material 3 in the first container 75 is fed into the first feed ports 76.

The second feed ports 77 also are communicated with the bottom face 75a of the first container 75. However, the second feed ports 77 are communicated with the second container 81 by a plurality of connecting tubes 82 provided to the second tank 72. The connecting tubes 82 extend from the lower face 72b of the second tank 72 in the direction along the Z-axis, and are communicated with the corresponding ones of the second feed ports 77. Consequently, the second material 4 in the second container 81 is fed into the second feed ports 77.

The opening-closing part 73 includes a plurality of closure plates 85. The closure plates 85 are arranged individually on the lower face 71b of the first tank 71. The respective closure plates 85 are arranged, for example, in the form of grid points, so as to cover corresponding ones of the first feed ports 76 and the second feed ports 77. The arrangement of the closure plates 85 is not limited to this example.

The communicating holes 46 are provided in the respective closure plates 85. Each of the closure plates 85 moves between an opening position P13 and a closing position P14 by, for example, rotating or moving along the lower face 71b of the first tank 71.

When the closure plate 85 is at the opening' position P13, the communicating hole 46 provided in this closure plate 85 communicates with the feed hole 41 of the first feed port 76 or second feed port 77 that corresponds to this closure plate 85. That is, the first feed port 76 or the second feed port 77 is opened by each of the communicating holes 46.

When the closure plate 85 is at the closing position P14, the communicating hole 46 provided in this closure plate 85 is shifted from a position at which the feed hole 41 of the first feed port. 76 or second feed port 77 that corresponds to this closure plate 85 is provided. Therefore, the closure plate 85 closes the feed hole 41 of the first feed port 76 or second feed port 77 that corresponds to this closure plate 85.

The controller 19 individually moves each of the closure plates 85 of the opening-closing part 73 between the opening position P13 and the closing position P14. In other words, the opening-closing part 73 individually opens and closes the first feed ports 76 and the second feed ports 77.

Figure 12:
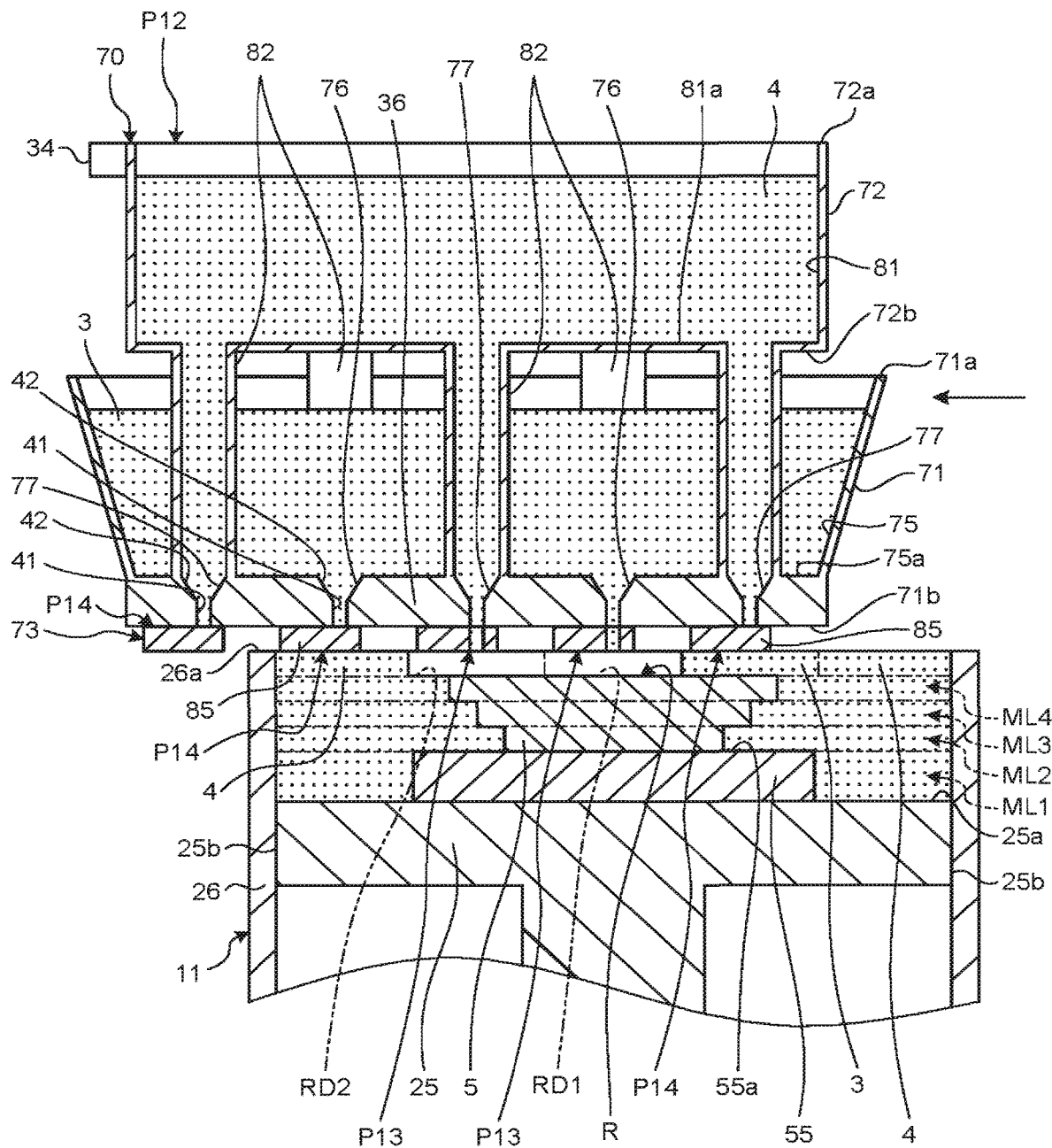
FIG. 12 is a sectional view illustrating the stage and the material feeder at a second position in the second embodiment.

The first moving device 12 moves the material feeder 70 between a first position P11 illustrated in FIG. 11 and a second position P12 illustrated in FIG. 12. The first position P11 is, for example, the same position as the feed position P1. The second position P12 is a position at which the first position P11 would arrive by being shifted in the direction along the X-axis or the Y-axis. The distance by which the material feeder 70 moves from the first position P11 to the second position P12 is equal to the length (for example, 1 mm) of one side of divided sections RD1 and RD2. The first position P11 and the second position P12 are not limited to this example.

The above-described material feeder 70 in the second embodiment is arranged at the first position P11 at the start, as illustrated in FIG. 11. The controller 19 controls the opening-closing part 73 to individually open and close the first feed ports 76 and the second feed ports 77.

Specific description is given below. When any one of the first feed ports 76 faces one of the divided sections RD1, the closure plate 85 that corresponds to this first feed port 76 is moved to the opening position P13. Consequently, this first feed port 76 is opened by the communicating hole 46. In contrast, when any one of the first feed ports 76 faces one of the divided sections RD2, the closure plate 85 that corresponds to this first feed port 76 is placed at the closing position P14. Consequently, this first feed port 76 is closed by the closure plate 85.

When the second feed port 77 faces one of the divided sections RD2, the closure plate 85 that corresponds to this second feed port 77 is moved to the opening position P13. Consequently, this second feed port 77 is opened by the communicating hole 46. In contrast, when the second feed port 77 faces one of the divided sections RD1, the closure plate 85 that corresponds to this second feed port 77 is placed at the closing position P14. Consequently, this second feed port 77 is closed by the closure plate 85.

As described above, the first feed ports 76 that are opposed to the divided sections RD1 and the second feed ports 77 that is opposed to the divided sections RD2 are opened by the opening-closing part 73. The first feed ports 76 thus opened feed the first material 3 in the first container 75 to the divided sections RD1. The second feed ports 77 thus opened feed the second material 4 in the second container 81 to the divided sections RD2. Consequently, on the feed region R, a layer of the first material 3 and the second material 4 is partially formed.

After the first material 3 and the second material 4 are fed onto the feed region R, all of the closure plates 85 are set at the closing positions P14. Consequently, all of the first feed ports 76 and the second feed ports 77 are closed by the closure plates 85.

Subsequently, as illustrated in FIG. 12, the first moving device 12 moves the material feeder 70 to the second position P12. Consequently, the divided sections RD1 and RD2 that have faced the first feed ports 76 at the first position P11 face the second feed ports 77 this time. In addition, the divided sections RD1 and RD2 that have faced the second feed ports 77 at the first position P11 face the first feed ports 76 this time. That is there is a change as to which of the first feed port 76 and the second feed port 77 corresponds to each of the divided sections RD1 and RD2.

The controller 19 again controls the opening-closing part 73 to individually open and close the first feed ports 76 and the second feed ports 77. That is, the first feed ports 76 that are located above the divided sections RD1 are opened, and the second feed ports 77 that are located above the divided sections RD2 are opened. Consequently, the first or the second material 3 or 4 is fed by the material feeder 70 at the second position P12 to a part to which neither the first material 3 nor the second material 4 has been fed by the material feeder 70 at the first position P11.

At the first position P11 and the second position P12, the material feeder 70 feeds the first material 3 and the second material 4 onto the feed region R. Consequently, the feed region R is entirely covered by the first material 3 and the second material 4 that have been fed to the divided sections RD1 and RD2, so that successive layers ML2, ML3, ML4, and so on of the first material 3 and the second material 4 are formed on the entirety of the feed region R.

In the three-dimensional printer 1 in the second embodiment, the first material 3 contained in the first container 75 is fed from the first feed ports 76, and the second material 4 contained in the second container 81 is fed from the second feed ports 77. Consequently, the layers ML2, ML3, ML4, and so on each using a plurality of kinds of material (the first material 3 and the second material 4) can be formed with the single material feeder 70. In other words, the layers ML2, ML3, ML4, and so on are formed with the first material 3 and the second material 4 fed concurrently to the divided sections RD1 and RD2, so that the first material 3 and the second material 4 are fed onto a wider range in a shorter time. Therefore, the material feeder 70 can be produced at a lower cost and curtail the time taken for moving. As a result, the three-dimensional printer 1 can be produced at a lower cost, and the manufactured object 5 can be manufactured more efficiently. In addition, unevenness in quantity and in thickness of the first material 3 and the second material 4 by location can be reduced.

Figure 13:
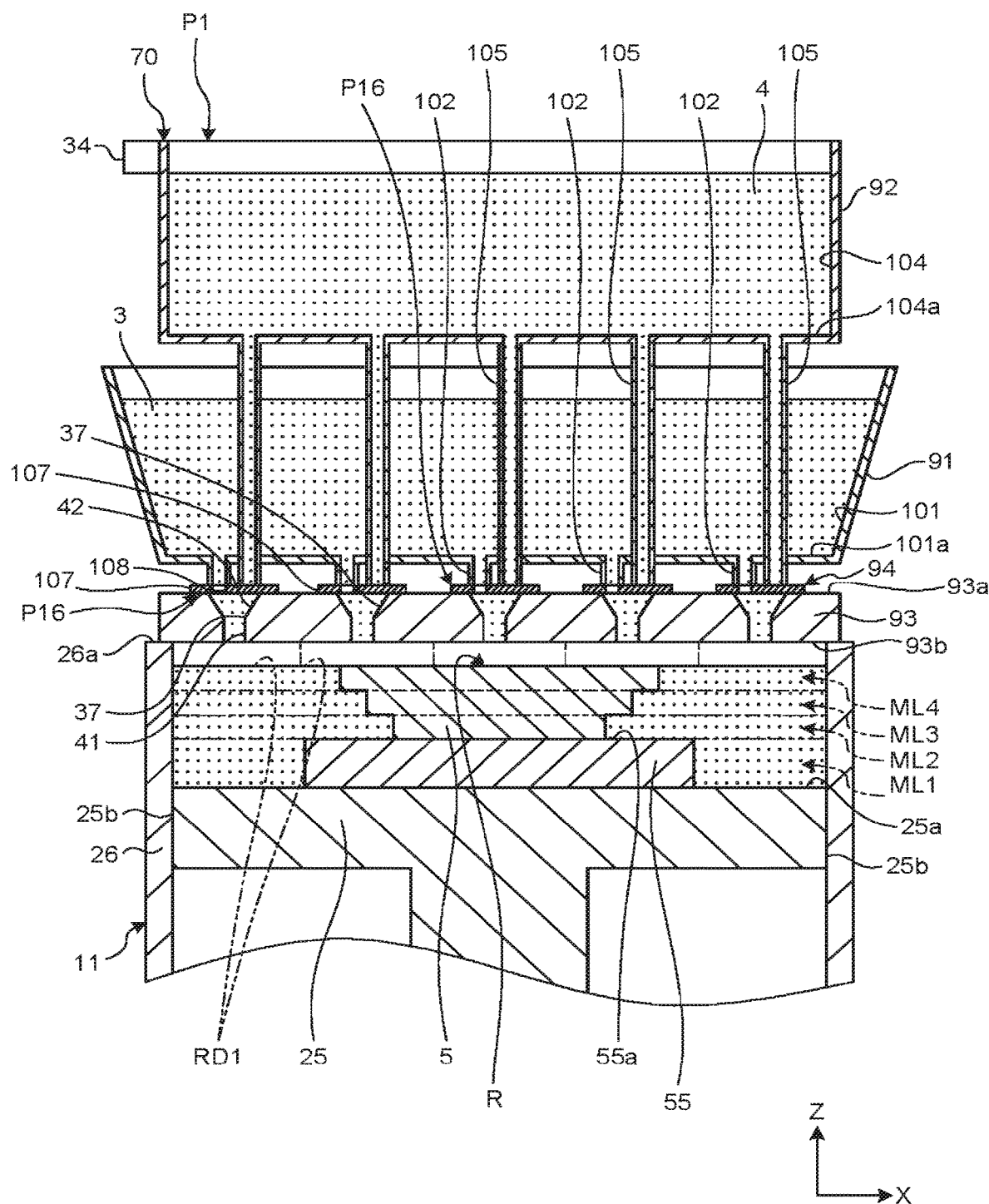
FIG. 13 is a sectional view illustrating a stage and a material feeder in the third embodiment.

Hereinafter, a third embodiment will be described with reference to FIG. 13 and FIG. 14. FIG. 13 is a sectional view illustrating a part of the stage 11 and the material feeder 70 according to the third embodiment.

As illustrated in FIG. 13, the material feeder 70 in the third embodiment includes a first tank 91, a second tank 92, a wall part 93, an opening-closing part 94, and the vibrator 34. The wall part 93 is an example of a wall and an example of a first wall.

The first tank 91 is formed substantially into a frustum shape as in the case of the first tank 71 in the second embodiment. The first tank 91 is provided with a first container 101 and a plurality of first feed tubes 102. The first feed tubes 102 are an example of first intermediary parts, and may be also referred to as nozzles, pipes, or tubes, for example.

The first container 101 forms a frustum-shape concave part as in the case of the first container 75 in the second embodiment. The first container 101 has a bottom face 101a. The first container 101 contains the first material 3.

The first feed tubes 102 are, for example, circular tubes. The first feed tubes 102 are communicated with the bottom face 101a of the first container 101 and extend along the Z-axis downward from the first tank 91.

The second tank 92 is formed into a substantially quadrangular box shape as in the case of the second tank 72 in the second embodiment. The second tank 92 is arranged above the first tank 91. The second tank 92 is provided with a second container 104 and a plurality of second feed tubes 105. The second feed tubes 105 are an example of second intermediary parts, and may be also referred to as nozzles, pipes, or tubes, for example.

The second container 104 forms a rectangular parallelepiped-shaped concave part that is quadrangular in a plan view, as in the case of the second container 81 in the second embodiment. The second container 104 has a bottom face 104a. The second container 104 contains the second material 4.

The second feed tubes 105 are, for example, circular tubes. The second feed tubes 105 are communicated with the bottom face 104a of the second container 104 and extend along the Z-axis in downward from the second tank 92. The second feed tubes 105 penetrate the bottom face 101a of the first container 101 and extend along the Z-axis downward from the first tank 91.

The wall part 93 is a quadrangular plate-shaped member. The wall part 93 has an upper face 93a and a lower face 93b that are flat. The upper face 93a faces the first tank 91 with a gap therebetween. The lower face 93b is located on the opposite side of the upper face 93a, and faces a feed region R when the material feeder 70 is at the feed position P1.

The feed ports 37 are provided in the wall part 93. The feed ports 37 each have the feed hole 41 and the introducing part 42 and are arranged in the form of grid points as in the first embodiment. The feed hole 41 is communicated with the lower face 93b of the wall part 93. The introducing parts 42 are communicated with the upper face 93a of the wall part 93.

The distal ends of the respective first feed tubes 102 of the first tank 91 face the introducing parts 42 of the corresponding feed ports 37. Each of the first feed tubes 102 is thus provided between the first container 101 and a corresponding one of the feed ports 37. The first material 3 in the first container 101 can be fed from the first feed tubes 102 into the corresponding feed ports 37.

The distal ends of the respective second feed tubes 105 of the second tank 92 face the introducing parts 42 of the corresponding feed ports 37. Each of the second feed tubes 105 is thus provided between the second container 104 and a corresponding one of the feed ports 37. The second material 4 in the second container 104 can be fed from the second feed tubes 105 into the corresponding feed ports 37. That is, while the first feed tubes 102 are capable of feeding the first material 3 into the introducing parts 42 of the respective feed ports 37, the second feed tubes 105 are capable of feeding the second material 4 thereinto.

The opening-closing part 94 includes a plurality of closure plates 107. The closure plates 107 are arranged individually on the upper face 93a of the wall part 93. The respective closure plates 107 are arranged, for example, in the form of grid points, so as to cover the introducing parts 42 of the corresponding feed ports 37. The arrangement of the closure plates 107 is not limited to this example.

Each of the closure plates 107 is interposed between the distal end of a first feed tube 102 of the first feed tubes 102 that corresponds thereto and a corresponding one of the feed ports 37 and between the distal end of a second feed tube 105 of the second feed tubes 105 that corresponds thereto and a corresponding one of the feed ports 37. Each of the closure plates 107 is brought into contact with the distal end of the first feed tube 102 that corresponds thereto. Each of the closure plates 107 is further brought into contact with the distal end of the second feed tube 105 that corresponds thereto.

Figure 14:
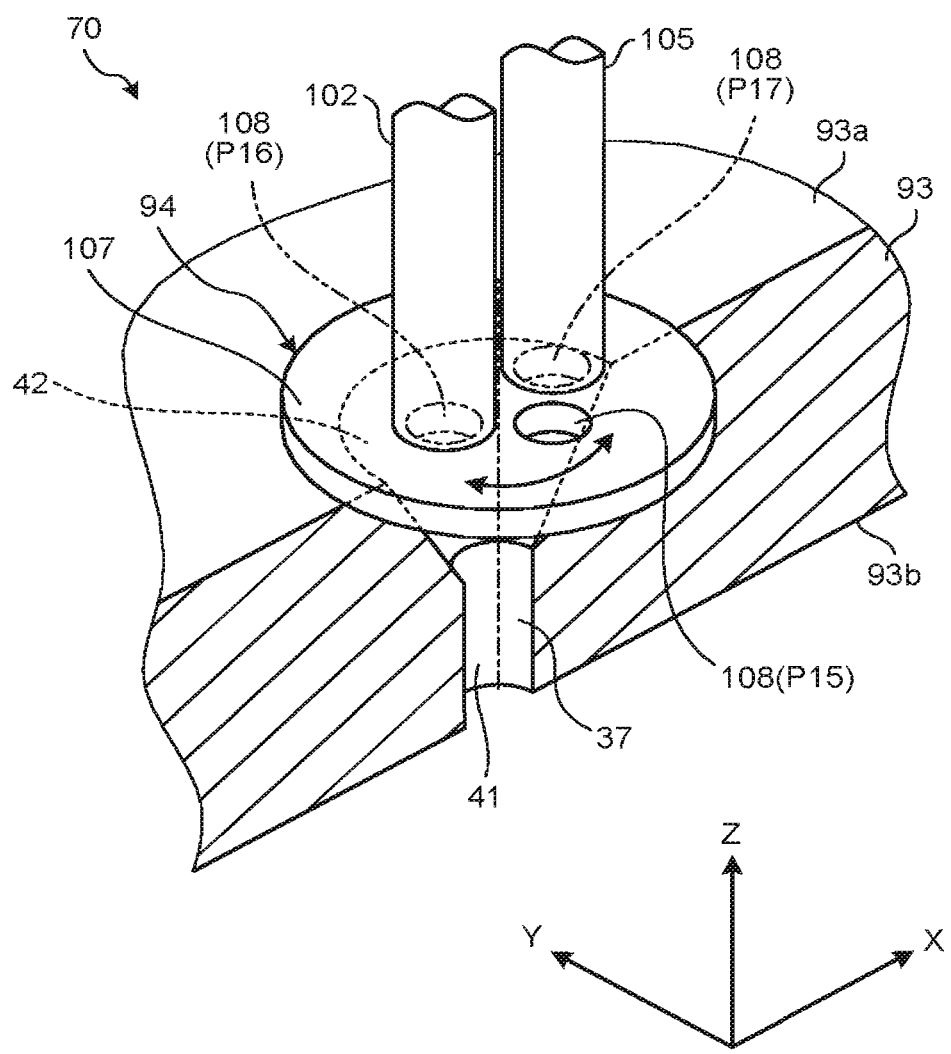
FIG. 14 is a perspective view illustrating a part of the material feeder in the neighborhood of a feed port, in the third embodiment.

FIG. 14 is a perspective view illustrating a part of the material feeder 70 in the neighborhood of one of the feed ports 37. As illustrated in FIG. 14, communicating holes 108 are provided in the respective closure plates 107. Each of the closure plates 107 moves from one position to another among a closing position P15, a first opening position P16, and a second opening position P17 by, for example, being rotated by a motor. The closing position P15 is an example of a first position. The first opening position P16 is an example of a second position. The second opening position P17 is an example of a third position.

When the closure plate 107 is at the closing position P15, the communicating hole 108 provided in this closure plate 107 is shifted from the distal end of either of the first feed tube 102 and the second feed tube 105 that correspond to the feed port 37 on which this closure plate 107 is provided. Therefore, the closure plate 107 closes the first feed tube 102 and second feed tube 105 that correspond to this feed port 37.

When the closure plate 107 is at the first opening position P16, the communicating hole 108 provided in this closure plate 107 communicates with the first feed tube 102 that corresponds to the feed port 37 on which this closure plate 107 is provided. In FIG. 14, the communicating hole 108 located at the first opening position P16 is indicated by a long dashed double-dotted line. That is, the first feed tube 102 and the corresponding feed port 37 communicate with each other through the communicating hole 108. In contrast, the second feed tube 105 is closed by the closure plate 107.

When the closure plate 107 is at the second opening position P17, the communicating hole 108 provided in this closure plate 107 communicates with the second feed tube 105 that corresponds to the feed port 37 on which this closure plate 107 is provided. In FIG. 14, the communicating hole 108 located at the second opening position P17 is indicated by a long dashed double-dotted line. That is, the second feed tube 105 and the corresponding feed port 37 communicate with each other through the communicating hole 108. In contrast, the first feed tube 102 is closed by the closure plate 107.

The controller 19 controls the opening-closing part 94 so as to individually move each of the closure plates 107 from one position to another among the closing position P15, the first opening position P16, and the second opening position P17. In other words, the opening-closing part 94 opens and closes the first feed tubes 102 and the second feed tubes 105 individually.

The above-described material feeder 70 in the third embodiment, when being at the feed position P1, controls the opening-closing part 94 to open and close the first feed tubes 102 and the second feed tubes 105 individually. That is, the material feeder 70 opens the first feed tubes 102 that correspond to the feed ports 37 located above the divided sections RD1 at the same time as closing the second feed tubes 105 that correspond to these feed ports 37. In addition, the material feeder 70 closes the first feed tubes 102 that correspond to the feed ports 37 located above the divided sections RD2 at the same time as opening the second feed tubes 105 that correspond to these feed ports 37.

Each of the first feed tubes 102 feeds the first material 3 inside the first container 101 into the feed port 37 that has been brought into communication with this first feed tube 102. Consequently, this feed port 37 feeds the first material 3 onto the corresponding divided section RD1.

Each of the second feed tubes 105 feeds the second material 4 inside the second container 104 into the feed port 37 that has been brought into communication with this second feed tube 105. Consequently, this feed port 37 feeds the second material 4 onto the corresponding divided section RD2.

As described above, the feed ports 37 concurrently feed the first material 3 onto the divided sections RD1 and feed the second material 4 onto the divided sections RD2 with the first feed tubes 102 and the second feed tubes 105 individually being opened and closed by the opening-closing part 94. Consequently, the feed region R is entirely covered by layer of the first material 3 and the second material 4 that have been fed to the divided sections RD1 and RD2, so that successive layers ML2, ML3, ML4, and so on of the first material 3 and the second material 4 are formed on the entirety of the feed region R.

In the three-dimensional printer 1 in the third embodiment, the first feed tubes 102 feed the first material 3 inside the first container 101 into the respective feed ports 37. The respective second feed tubes 105 feed the second material 4 inside the second container 104 into the corresponding feed ports 37. The opening-closing part 94 closes, individually, at least one of: each of the first feed tubes 102; and a corresponding one of the second feed tubes 105. Consequently, the first material 3 and the second material 4 can be selectively fed onto the divided sections RD1 and RD2 without the material feeder 70 being moved. Thus, the layer ML2, ML3, ML4, and so on of a plurality of kinds of material. The first material 3 and the second material 4) can be easily formed. Therefore, the material feeder 70 can curtail the time taken for moving. As a result, the manufactured object 5 can be manufactured more efficiently.

According to at least one of the above-described embodiments, the feeding unit includes an opening-closing part capable of individually opening and closing a plurality of openings. A layer of one or more kinds of material is formed at least partially on a region by feeding the material thereon from at least one of the openings that is opened by this opening-closing part. Consequently, layers of powdery material can be formed in accordance with features of a manufactured object.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, in the above embodiment, the three-dimensional printer 1 manufactures the manufactured object 5 by melting the first material 3 and the second material 4 by the laser beam L. However, this is not limiting, and the three-dimensional printer 1 may manufacture the manufactured object 5 by, for example, feeding a bonding agent (a binder) to the first material 3 and the second material 4 by the ink-jet method or the like to partially solidify the first material 3 and the second material 4. In this case, the first material 3 and the second material 4 are not limited to metals, and may be other kinds of material such as resins.

Furthermore, in the above embodiments, the three-dimensional printer 1 uses the laser beam L as an energy ray for melting the first material 3 and the second material 4. However, any energy ray capable of melting the material in the same manner as the laser beam L is applicable, and may be, for example, an electron beam or an electromagnetic wave in the microwave to ultraviolet region.

The invention claimed is:

1. A material feeder of an additive manufacturing apparatus, the material feeder comprising:
   a feeding unit including:
      a container configured to contain powdery material;
      a first wall that is provided with a plurality of openings configured to be communicated with the container and that is configured to at least partially cover a region onto which the powdery material is fed; and
      an opening-closing part configured to individually open and close the openings,
   wherein the feeding unit is configured to feed the powdery material such that the powdery material inside the container falls by gravity onto the region from at least one of the openings that is opened by the opening-closing part to form a layer of the powdery material on at least a part of the region,
   the powdery material includes a first powdery material and a second powdery material,
   the container includes a first container and a second container, the first container is configured to contain the first powdery material, the second container is configured to contain the second powdery material,
   the openings include a plurality of first openings and a plurality of second openings, the first openings configured to be communicated with the first container and configured to feed the first powdery material onto the region, the second openings configured to be communicated with the second container and configured to feed the second powdery material onto the region,
   the region includes a plurality of sections,
   the feeding unit and the region are configured to be relatively placed at a first position and at a second position, such that one of the first openings faces one of the sections included in the region in the first position, and one of the second openings faces the one of the sections in the second position, and
   the feeding unit is configured to feed the first powdery material to at least one of the sections from at least one of the first openings while being at the first position and feed the second powdery material to at least one of the sections from at least one of the second openings while being at the second position to form the layer of the powdery material that includes the first powdery material and the second powdery material, the at least one of the sections fed with the first powdery material and the at least one of the sections fed with the second powdery material are different from each other.

2. The material feeder of an additive manufacturing apparatus according to claim 1, wherein
   the feeding unit includes a plurality of feeding units,
   the container of each one of the plurality of feeding units is configured to contain a material that is different from a material contained in the container of any other feeding unit of the plurality of feeding units, and
   the plurality of feeding units are configured to individually feed the respective materials onto the region to form a layer including the different materials contained in the respective containers of the plurality of feeding units.

3. The material feeder of an additive manufacturing apparatus according to claim 1, wherein the first openings and the second openings are arranged in the fonn of grid points and alternately.

4. The material feeder of an additive manufacturing apparatus according to claim 1 further comprising a vibrator configured to vibrate the feeding unit.

5. The material feeder of an additive manufacturing apparatus according to claim 1, wherein
the opening-closing part includes a plurality of closure plates, each being provided with a communicating hole,
each of the closure plates is configured to move between a closing position and an opening position, and
a closure plate of the closure plates configured to close one of the openings at the closing position and is configured to communicate the communicating hole with the one of the openings at the opening position.

6. The material feeder of an additive manufacturing apparatus according to claim 1, wherein a diameter of each of the openings is configured to be 6 times or more of a particle size of the material.

7. The material feeder of an additive manufacturing apparatus according to claim 6, wherein the openings are a plurality of circular holes.

8. The material feeder of an additive manufacturing apparatus according to claim I, wherein the feeding unit is configured to form the layer of the powdery material by feeding and leveling the powdery material.

9. An additive manufacturing apparatus comprising:
a feeding unit including:
a container that is configured to contain powdery material;
a wall that is provided with a plurality of openings configured to be communicated with the container and that is configured to at least partially cover a region onto which the powdery material is fed; and
an opening-closing part configured to individually open and close the openings,
wherein the feeding unit configured to feed the powdery material such that the powdery material inside the container falls by gravity onto the region from at least one of the openings that is opened by the opening-closing part to form a layer of the powdery material on at least a part of the region;
a moving unit that is configured to change a relative position of the feeding unit with respect to the region; and
a forming unit that is configured to partially solidify the powdery material fed onto the region by the feeding unit, wherein
the powdery material includes a first powdery material and a second powdery material,
the container includes a first container and a second container, the first container is configured to contain the first powdery material, the second container is configured to contain the second powdery material,
the openings include a plurality of first openings and a plurality of second openings, the first openings configured to be communicated with the first container and configured to feed the first powdery material onto the region, the second openings configured to be communicated with the second container and configured to feed the second powdery material onto the region,
the region includes a plurality of sections,
the moving unit is configured to relatively place the feeding unit and the region at a first position and at a second position, such that one of the first openings faces one of the sections included in the region in the first position, and one of the second openings faces the one of the sections in the second position, and
the feeding unit is configured to feed the first powdery material to at least one of the sections from at least one of the first openings while being at the first position and feed the second powdery material to at least one of the sections from at least one of the second openings while being at the second position to form the layer of the powdery material that includes the first powdery material and the second powdery material, the at least one of the sections fed with the first powdery material and the at least one of the sections fed with the second powdery material are different from each other.

10. The additive manufacturing apparatus according to claim 9, wherein
the feeding unit includes a plurality of feeding units,
the container of each one of the plurality of feeding units is configured to contain a material that is different from a material contained in the container of any other feeding unit of the plurality of feeding units, and
the plurality of feeding units are configured to individually feed the respective materials onto the region to form a layer including the different materials contained in the respective containers on the region.

11. The additive manufacturing apparatus according to claim 9, wherein
the first openings and the second openings are arranged in the form of grid points and alternately.

12. The additive manufacturing apparatus according to claim 9 further comprising a vibrator configured to vibrate the feeding unit.

13. The additive manufacturing apparatus according to claim 9, wherein a diameter of each of the openings is configured to be 6 times or more of a particle size of the material.

14. The additive manufacturing apparatus according to claim 13, wherein the openings are a plurality of circular holes.

15. The additive manufacturing apparatus according to claim 9, wherein the feeding unit is configured to form the layer of the powdery material by feeding and leveling the powdery material.

* * * * *